US011118306B2

(12) United States Patent
Komori

(10) Patent No.: US 11,118,306 B2
(45) Date of Patent: Sep. 14, 2021

(54) WEB FORMING DEVICE, WEB FORMING METHOD, AND SHEET MANUFACTURING APPARATUS

(71) Applicant: Seiko Epson Corporation, Tokyo (JP)

(72) Inventor: Sadaharu Komori, Shiojiri (JP)

(73) Assignee: Seiko Epson Corporation

( * ) Notice: Subject to any disclaimer, the term of this patent is extended or adjusted under 35 U.S.C. 154(b) by 237 days.

(21) Appl. No.: 16/366,082

(22) Filed: Mar. 27, 2019

(65) Prior Publication Data
US 2019/0301093 A1 Oct. 3, 2019

(30) Foreign Application Priority Data
Mar. 28, 2018 (JP) .............................. JP2018-061110

(51) Int. Cl.
*D21F 7/06* (2006.01)
*D21F 1/80* (2006.01)
*D21F 9/00* (2006.01)
*D21B 1/10* (2006.01)

(52) U.S. Cl.
CPC ............... *D21B 1/10* (2013.01); *D21F 1/80* (2013.01); *D21F 7/06* (2013.01); *D21F 9/00* (2013.01)

(58) Field of Classification Search
CPC ..... D21B 1/10; D21F 9/00; D21F 7/06; D21F 1/80; Y02W 30/64
See application file for complete search history.

(56) References Cited

U.S. PATENT DOCUMENTS

| 4,742,675 | A | * | 5/1988 | Leifeld | .................... | D01H 5/42 19/105 |
|---|---|---|---|---|---|---|
| 8,882,965 | B2 | | 11/2014 | Yamagami et al. | | |
| 9,194,081 | B2 | | 11/2015 | Yamagami | | |
| 9,435,078 | B2 | | 9/2016 | Yamagami et al. | | |
| 9,636,847 | B2 | | 5/2017 | Yamagami et al. | | |
| 9,890,499 | B2 | | 2/2018 | Yamagami | | |

(Continued)

FOREIGN PATENT DOCUMENTS

| JP | H10-017146 A | 1/1998 |
|---|---|---|
| JP | 2770833 B2 | 7/1998 |
| JP | 2012-144826 A | 8/2012 |

*Primary Examiner* — Eric Hug
*Assistant Examiner* — Matthew M Eslami
(74) *Attorney, Agent, or Firm* — Harness, Dickey & Pierce, P.L.C.

(57) ABSTRACT

A web forming device includes: a defibrator having a variable speed rotor, and configured to defibrate defibration feedstock by rotation of the rotor; an accumulator on which defibrated material defibrated by the defibrator accumulates; a thickness detector configured to detect a thickness of the defibrated material accumulated on the accumulator; and a controller configured to control a rotational velocity of the rotor based on a detection result from the thickness detector. The controller applies either or both a first control and a second control, the first control decreasing the rotational velocity of the rotor when variation in the thickness of the deposited defibrated material detected by the thickness detector exceeds a first tolerance, and the second control increasing the rotational velocity of the rotor when a slope of change over time in a thickness of the deposited defibrated material detected by the thickness detector is less than a second tolerance.

12 Claims, 13 Drawing Sheets

(56) References Cited

U.S. PATENT DOCUMENTS

| | | | |
|---|---|---|---|
| 2016/0122946 A1* | 5/2016 | Mantyla | D21G 9/0009 |
| | | | 118/697 |
| 2016/0236380 A1* | 8/2016 | Fujita | D21F 9/00 |
| 2017/0198434 A1* | 7/2017 | Yamagami | D21H 11/14 |
| 2019/0385876 A1* | 12/2019 | Tanaka | H01L 21/3065 |

* cited by examiner

WEB FORMING DEVICE, WEB FORMING METHOD, AND SHEET MANUFACTURING APPARATUS

BACKGROUND

1. Technical Field

The present invention relates to a web forming device, a web forming method, and a sheet manufacturing apparatus.

2. Related Art

With increased concern about the environment, interest in both reducing consumption of paper (recording media) in the workplace, and recycling paper in the workplace, has grown.

As a system for recycling paper, JP-A-2012-144826 describes an apparatus that shreds and defibrates paper that has already been used (known as recovered paper) and forms the defibrated material into sheets, thus recycling used paper into new paper. The paper recycling system described in JP-A-2012-144826 detects the thickness of the paper (deinked fiber material) on a mesh belt, and based on the detection result controls paper recycling conditions such as the speed of the mesh belt.

There are many different types of recovered paper, ranging from paper that is relatively easy to defibrate to paper that is relatively difficult to defibrate. The feedstock loaded into the paper recycling system may also include a mixture of both types of paper. If the defibrating operation of the defibrator in the paper recycling system remains constant, recovered paper that is relatively easily defibrated will be defibrated more finely than recovered paper that is relatively difficult to defibrate, resulting in excessive defibration. Excessive defibration can then result in inconsistent grammage or inconsistent thickness in different sheets of paper or even within a single sheet of paper.

SUMMARY

An object of the present invention is to provide a web forming device, a web forming method, and a sheet manufacturing apparatus that assure uniform grammage and thickness in the manufactured sheets when recycling defibrated material into new sheets.

The present invention is directed to solving the foregoing problem, and can be embodied as described below.

A web forming device according to the invention includes a defibrator having a variable speed rotor, and configured to defibrate defibration feedstock by rotation of the rotor; an accumulator on which defibrated material defibrated by the defibrator accumulates; a thickness detector configured to detect a thickness of the defibrated material accumulated on the accumulator; and a controller configured to control a rotational velocity of the rotor based on a detection result from the thickness detector; the controller applying either or both a first control and a second control, the first control decreasing the rotational velocity of the rotor when variation in the thickness of the deposited defibrated material detected by the thickness detector exceeds a first tolerance, and the second control increasing the rotational velocity of the rotor when a slope of change over time in a thickness of the deposited defibrated material detected by the thickness detector is less than a second tolerance.

A web forming method according to the invention includes: a defibration step of defibrating, by rotation of a variable speed rotor, defibration feedstock supplied to the rotor; an accumulation step of accumulating defibrated material defibrated in the defibration step; and a thickness detection step configured to detect a thickness of the defibrated material accumulated in the accumulation step; in the defibration step, controlling a rotational velocity of the rotor based on a detection result from the thickness detection step, and applying in the defibration step either or both a first control and a second control, the first control decreasing the rotational velocity of the rotor when variation in the thickness of the accumulated defibrated material detected in the thickness detection step exceeds a first tolerance, and the second control increasing the rotational velocity of the rotor when a slope of change over time in a thickness of the accumulated defibrated material detected in the thickness detection step is less than a second tolerance.

A sheet manufacturing apparatus according to the invention includes the web forming device according to the invention, and is configured to make a sheet from the accumulated defibrated material.

Other objects and attainments together with a fuller understanding of the invention will become apparent and appreciated by referring to the following description and claims taken in conjunction with the accompanying drawings.

DESCRIPTION OF EMBODIMENTS

A web forming device, a web forming method, and a sheet manufacturing apparatus according to the invention are described below with reference to the accompanying figures.

Embodiment 1

Figure 1:
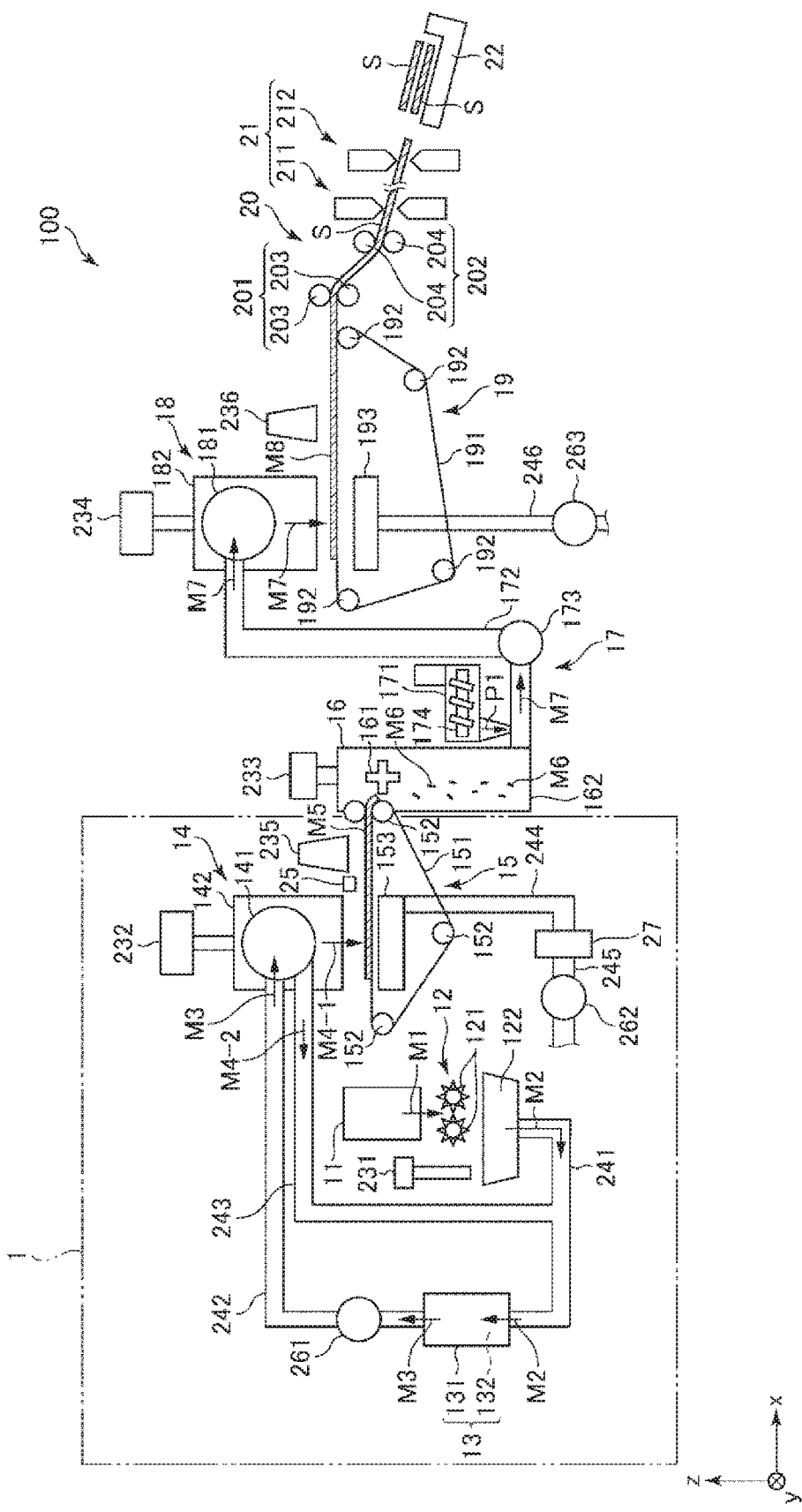
FIG. 1 is a schematic side view of a sheet manufacturing apparatus according to a first embodiment of the invention.
Figure 2:
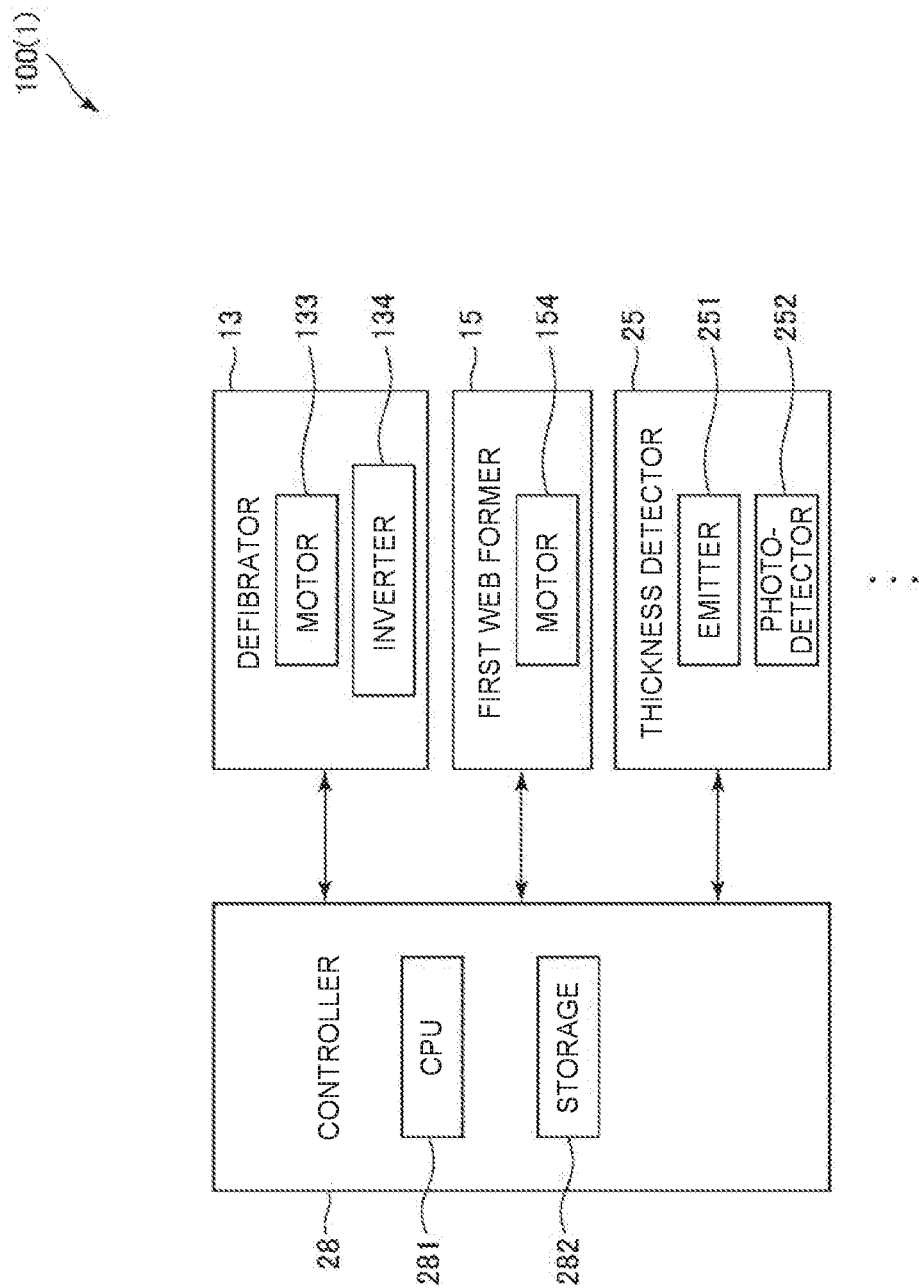
FIG. 2 is a block diagram of main parts of the sheet manufacturing apparatus (web forming device) shown in FIG. 1.
Figure 3:
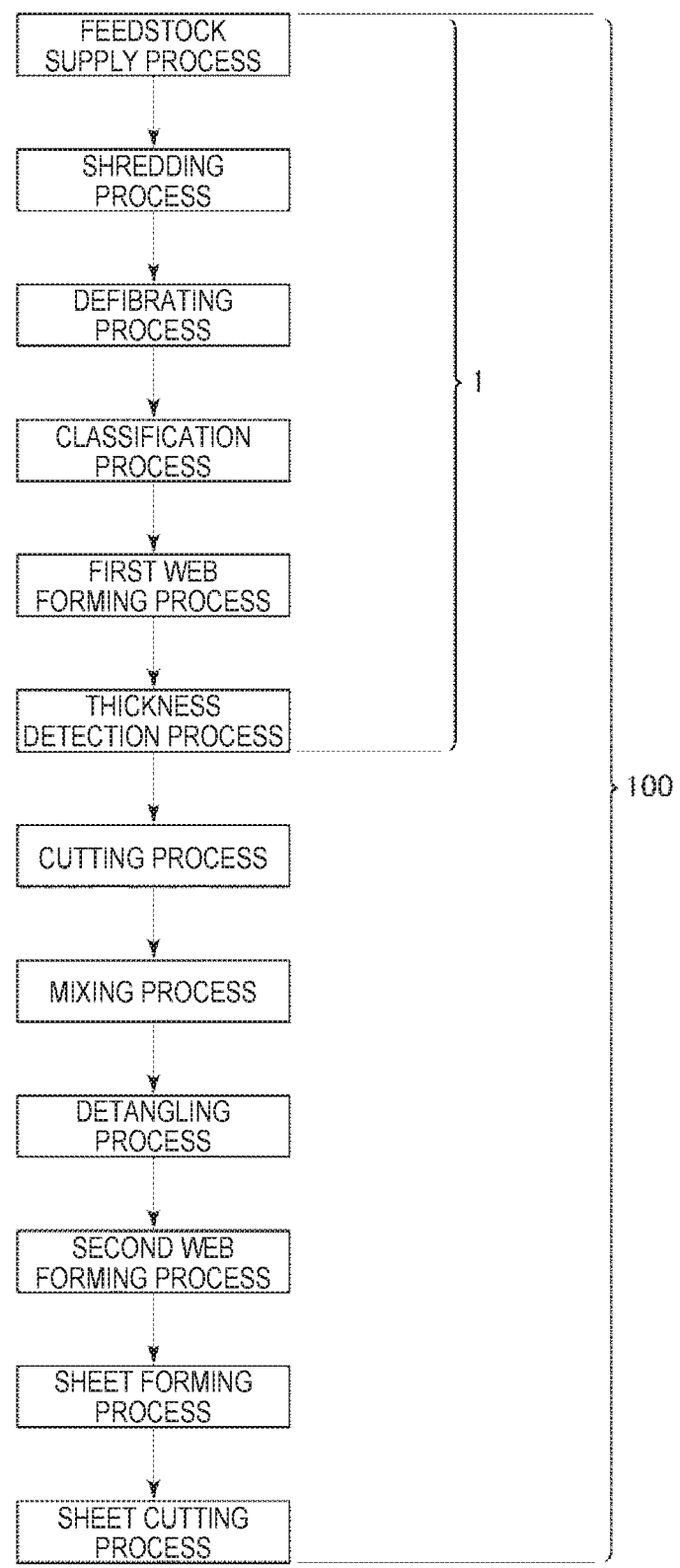
FIG. 3 illustrates a sequence of steps executed by the sheet manufacturing apparatus shown in FIG. 1.
Figure 4:
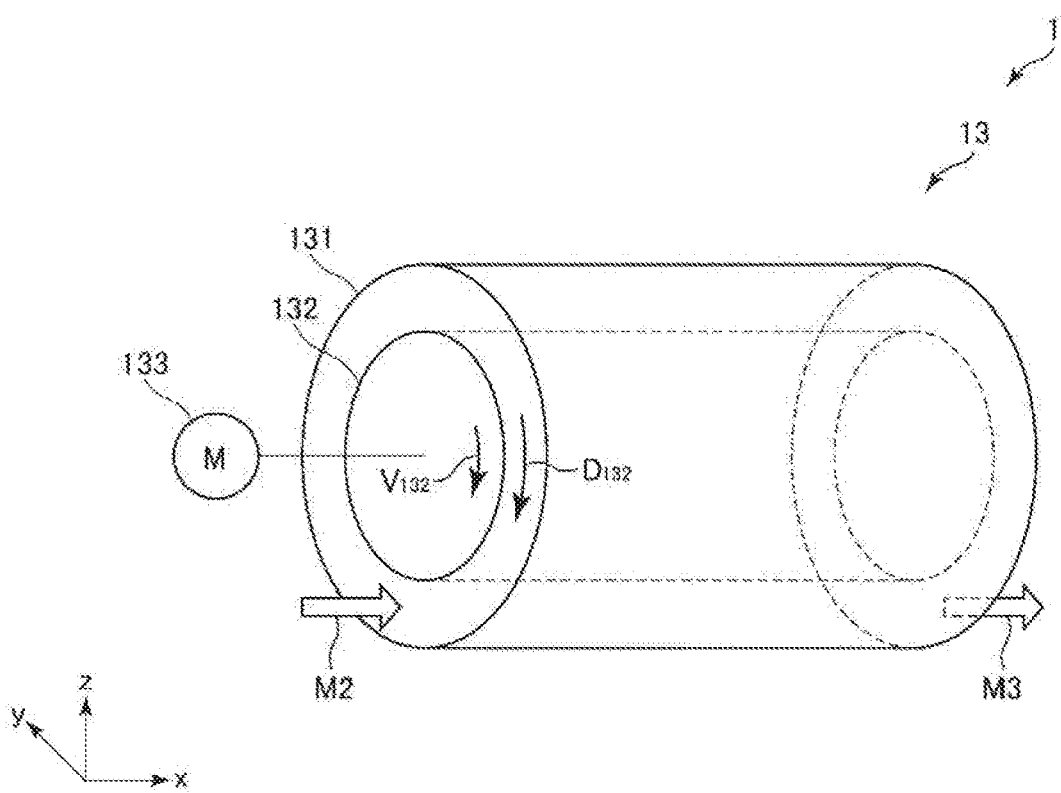
FIG. 4 is an oblique view of the rotor and stator of the defibrator in the web forming device of the sheet manufacturing apparatus shown in FIG. 1.
Figure 5:
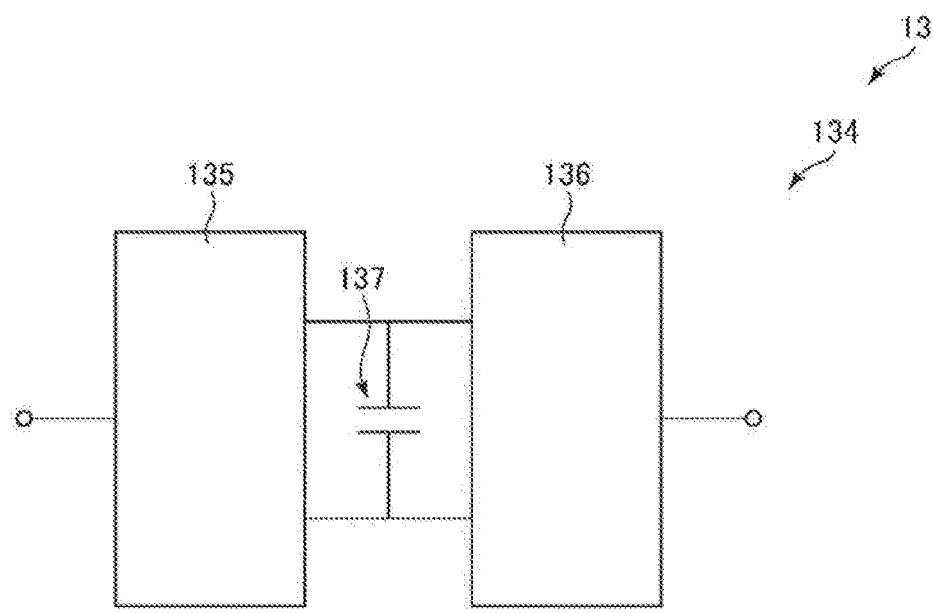
FIG. 5 is a circuit diagram of the inverter of the defibrator in the web forming device of the sheet manufacturing apparatus shown in FIG. 1.
Figure 6:
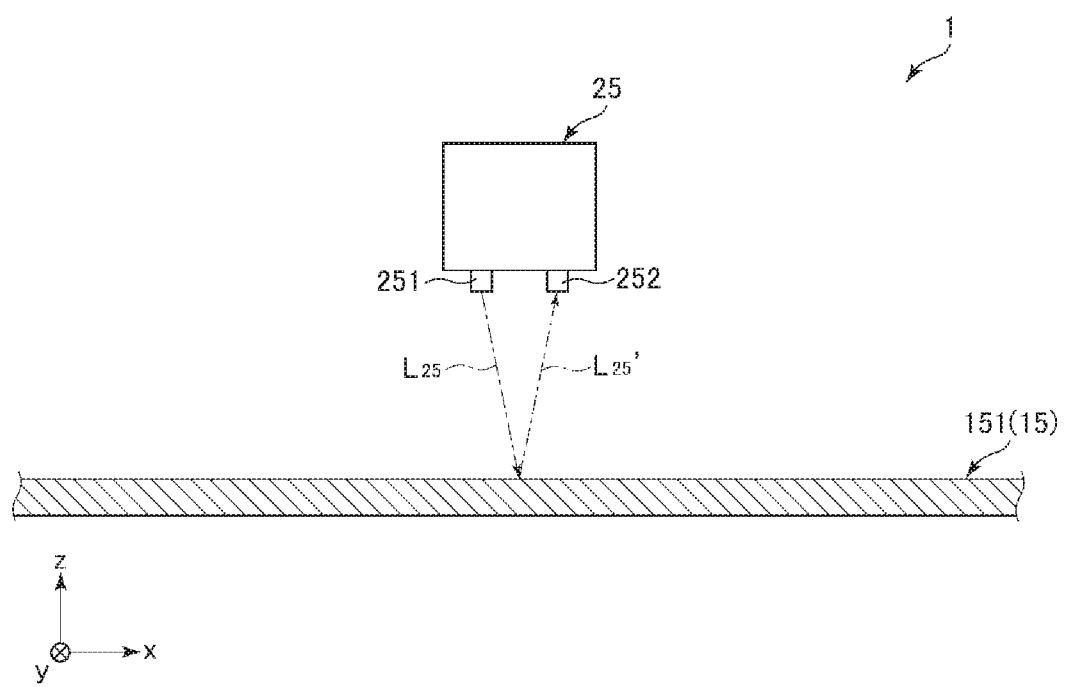
FIG. 6 is a side view of the thickness detector of the web forming device of the sheet manufacturing apparatus shown in FIG. 1.
Figure 7:
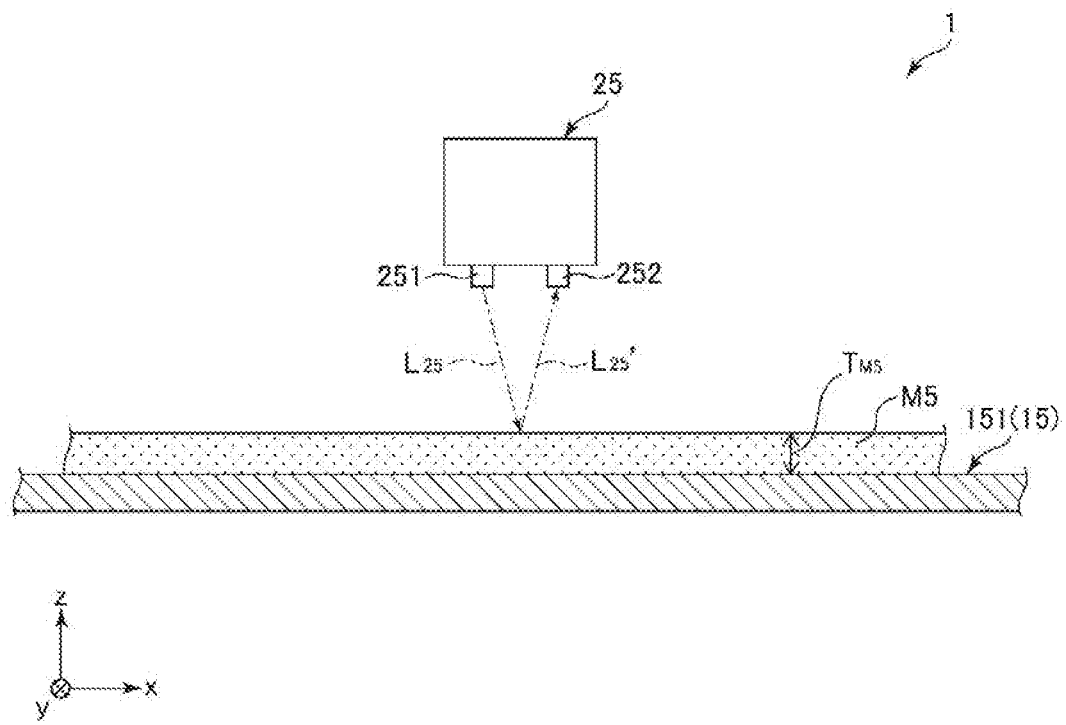
FIG. 7 is a side view of the thickness detector of the web forming device of the sheet manufacturing apparatus shown in FIG. 1.
Figure 8:
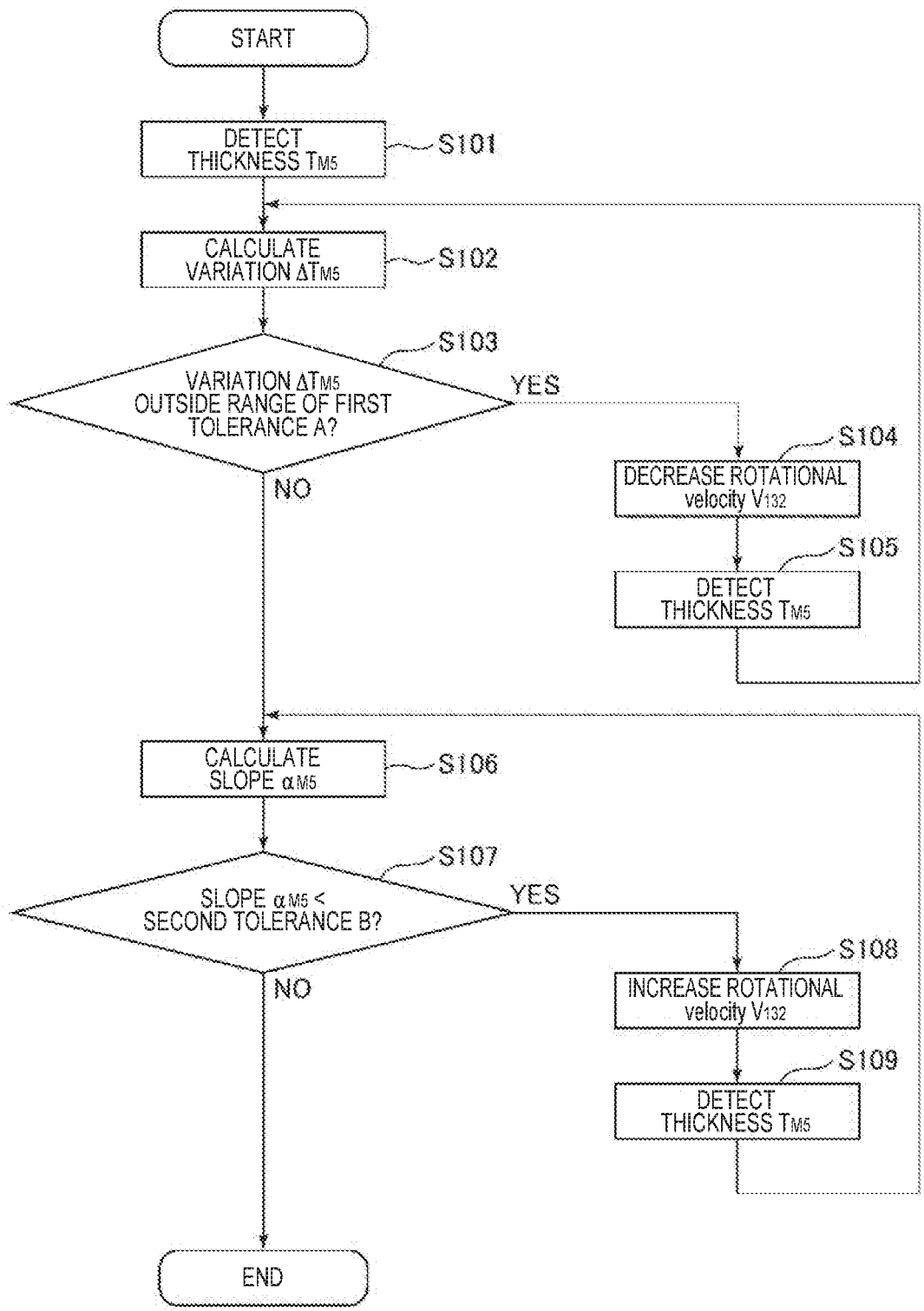
FIG. 8 is a flow chart of a control program executed by the controller of the sheet manufacturing apparatus (web forming device) shown in FIG. 1.
Figure 9:
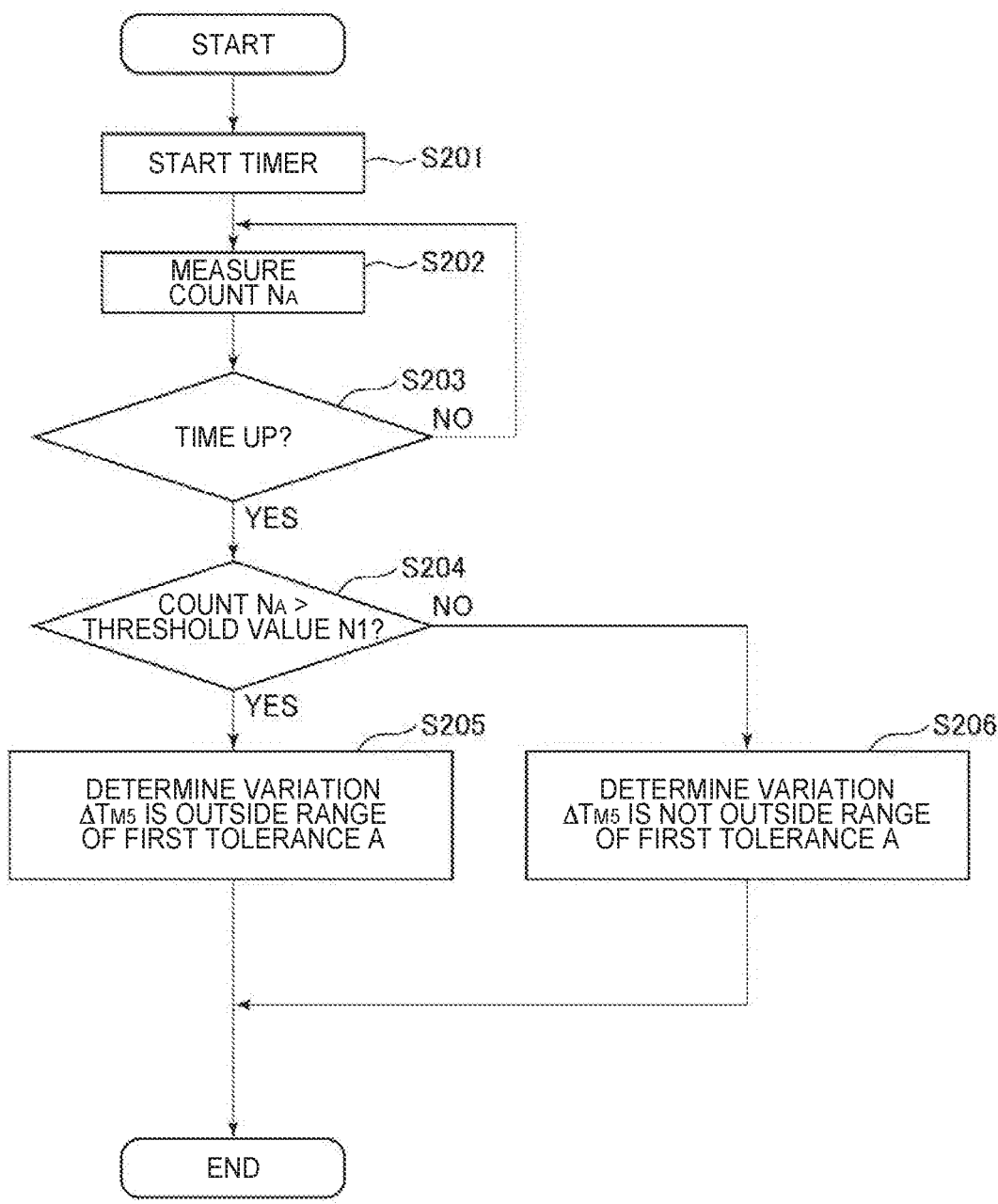
FIG. 9 is a flow chart of a control program executed by the controller of the sheet manufacturing apparatus (web forming device) shown in FIG. 1.
Figure 10:
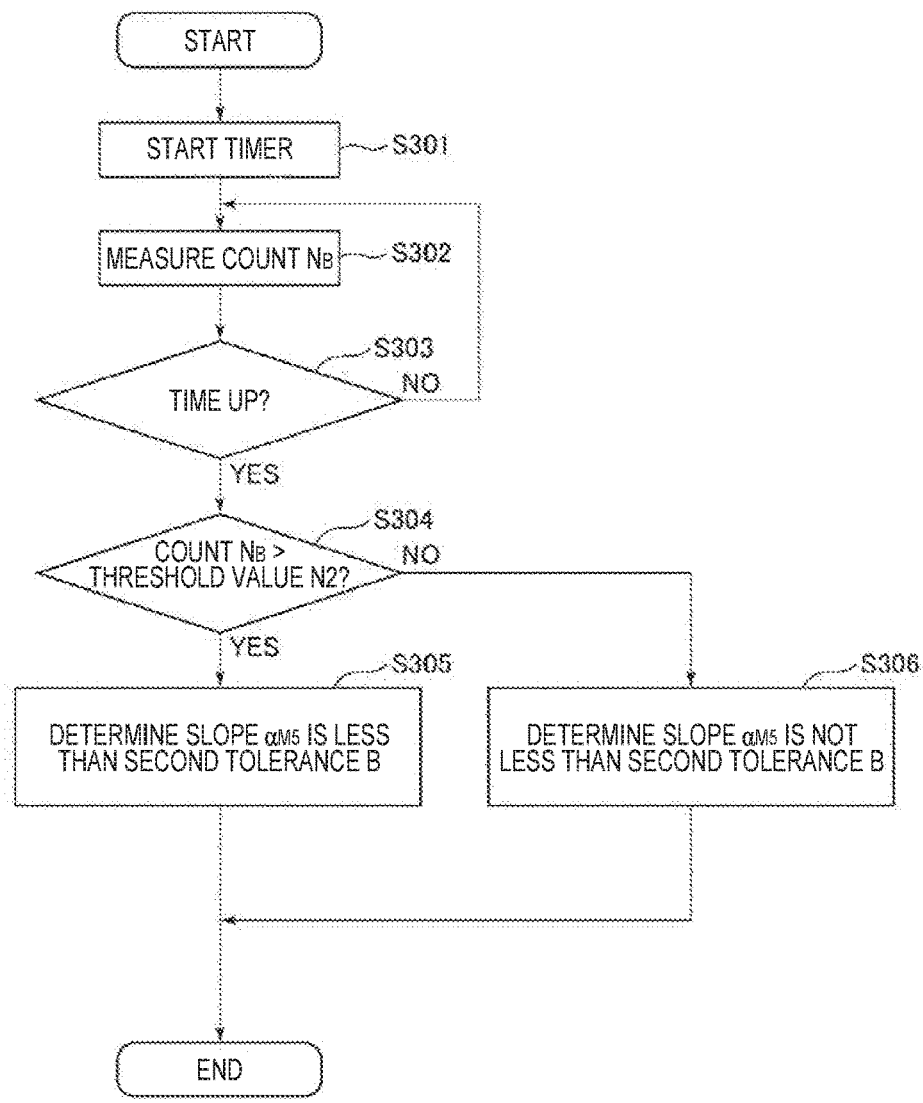
FIG. 10 is a flow chart of a control program executed by the controller of the sheet manufacturing apparatus (web forming device) shown in FIG. 1.
Figure 11:
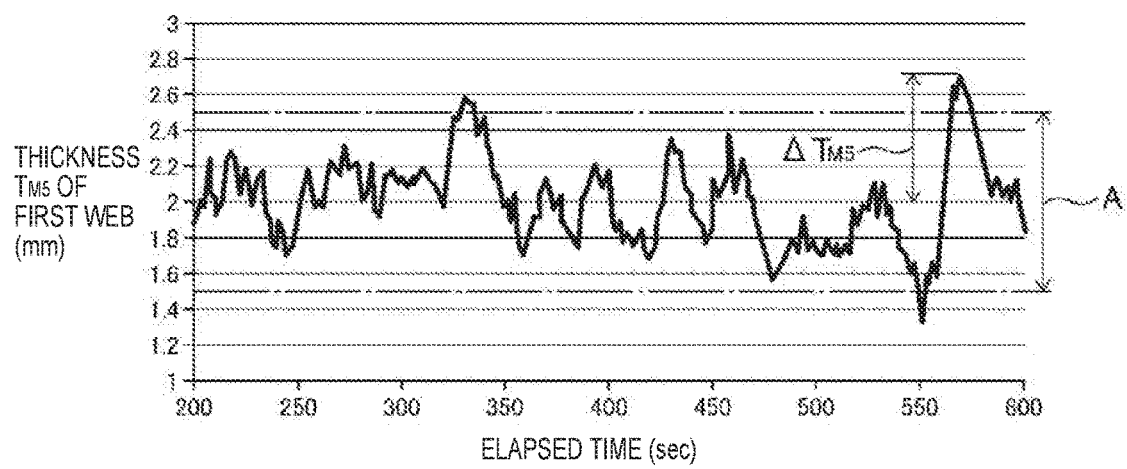
FIG. 11 is a graph showing an example of the relationship between elapsed time and the thickness of a first web.
Figure 12:
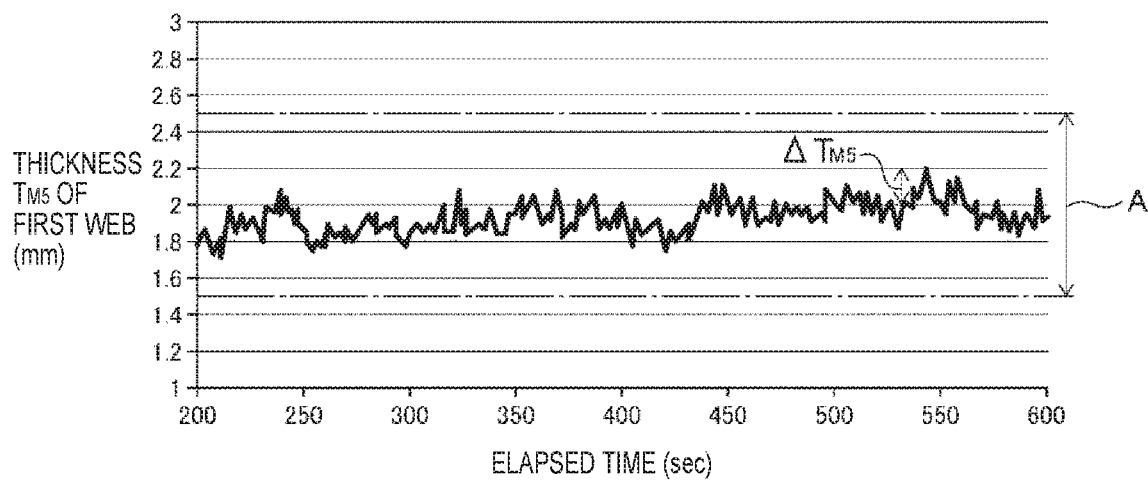
FIG. 12 is a graph showing an example of the relationship between elapsed time and the thickness of a first web.
Figure 13:
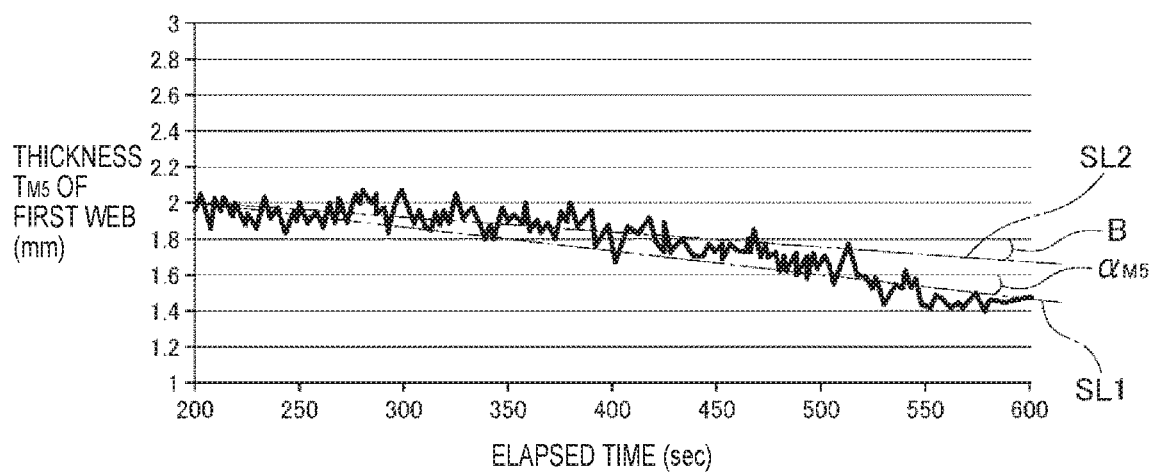
FIG. 13 is a graph showing an example of the relationship between elapsed time and the thickness of a first web.
Figure 14:
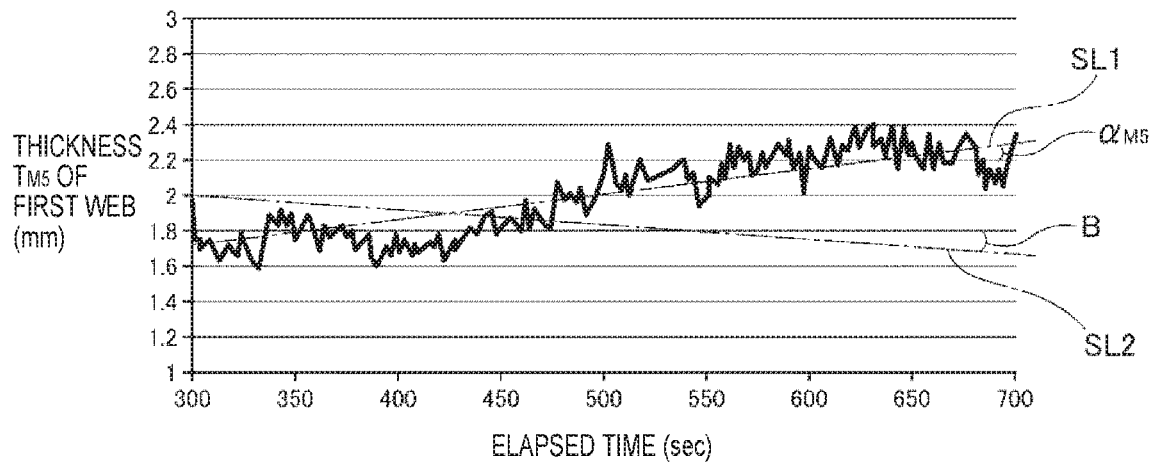
FIG. 14 is a graph showing an example of the relationship between elapsed time and the thickness of a first web.

FIG. 1 is a schematic side view of a sheet manufacturing apparatus according to a first embodiment of the invention. FIG. 2 is a block diagram of main parts of the sheet manufacturing apparatus (web forming device) shown in FIG. 1. FIG. 3 illustrates a sequence of steps executed by the sheet manufacturing apparatus shown in FIG. 1. FIG. 4 is an oblique view of the rotor and stator of the defibrator in the web forming device of the sheet manufacturing apparatus shown in FIG. 1. FIG. 5 is a circuit diagram of the inverter of the defibrator in the web forming device of the sheet manufacturing apparatus shown in FIG. 1. FIG. 6 and FIG. 7 are side views of the thickness detector of the web forming device of the sheet manufacturing apparatus shown in FIG. 1. FIG. 8 is a flow chart of a control program executed by the controller of the sheet manufacturing apparatus (web forming device) shown in FIG. 1. FIG. 9 is a flow chart of a control program executed by the controller of the sheet manufacturing apparatus (web forming device) shown in FIG. 1. FIG. 10 is a flow chart of a control program executed by the controller of the sheet manufacturing apparatus (web forming device) shown in FIG. 1. FIG. 11 is a graph showing an example of the relationship between elapsed time and the thickness of a first web. FIG. 12 is a graph showing an example of the relationship between elapsed time and the thickness of a first web. FIG. 13 is a graph showing an example of the relationship between elapsed time and the thickness of a first web. FIG. 14 is a graph showing an example of the relationship between elapsed time and the thickness of a first web.

Note that for convenience below, embodiments of the invention are described with reference to three mutually perpendicular axes, an X-axis, Y-axis, and Z-axis, as shown in FIG. 1. The x-y plane containing the X-axis and Y-axis is horizontal, and the Z-axis is vertical, perpendicular to the x-y plane. The directions indicated by the arrow on each axis is referred to as the forward or positive direction, and the opposite direction as the reverse or negative direction. In addition, in FIG. 1, FIG. 4, and FIG. 6 and FIG. 7, the side at the top is referred to as up or above; and the side at the bottom is referred to as down or below.

As shown in FIG. 1, the sheet manufacturing apparatus 100 includes a feedstock supply device 11, a shredder 12, a defibrator 13, a classifier 14, a first web former 15, a cutter 16, a mixing device 17, a detangler 18, a second web former 19, a sheet former 20, a sheet cutter 21, a stacker 22, a dust collector 27, and a thickness detector 25. The sheet manufacturing apparatus 100 also has wetting unit 231, wetting unit 232, wetting unit 233, wetting unit 234, wetting unit 235, and wetting unit 236. The sheet manufacturing apparatus 100 also has a blower 261, blower 262, and blower 263.

In this embodiment of the invention, the feedstock supply device 11, shredder 12, defibrator 13, classifier 14, first web former 15, dust collector 27, thickness detector 25, wetting unit 231, wetting unit 232, wetting unit 235, blower 261, and blower 262 are configured as a web forming device 1. Note that the configuration of the web forming device 1 is not so limited, and at least any one of the feedstock supply device 11, shredder 12, classifier 14, dust collector 27, wetting unit 231, wetting unit 232, wetting unit 235, blower 261, and blower 262 may be omitted.

As shown in FIG. 2, operation of parts of the sheet manufacturing apparatus 100 (such as the motor 133 and inverter 134 of the defibrator 13 in the web forming device 1, the motor 154 of the first web former 15, and the emitter 251 and photodetector 252 of the thickness detector 25) is controlled by the controller 28.

The controller 28 includes a CPU (central processing unit) 281 and storage 282. The CPU (central processing unit) 281 is a processor, and can process and run programs stored in the storage 282. This controller 28 may be built into the sheet manufacturing apparatus 100, or disposed to an external device such as an externally connected computer. The external device may connect to and communicate with the sheet manufacturing apparatus 100 through a cable or wirelessly, or connect to the sheet manufacturing apparatus 100 through a network (such as the Internet).

As shown in FIG. 3, the sheet manufacturing apparatus 100 executes, in order, a feedstock supply process, a shredding process, a defibrating process, a classification process, a first web forming process, a thickness detection process, a cutting process, a mixing process, a detangling process, a second web forming process, a sheet forming process, and a sheet cutting process. Of these processes, the feedstock supply process, the shredding process, the defibrating process, the classification process, the first web forming process, and the thickness detection process are executed by the web forming device 1.

The configurations of selected parts are described below.

The feedstock supply device 11 is the part that executes the feedstock supply process supplying feedstock M1 to the shredder 12. The feedstock M1 is a sheet material containing fiber (cellulose fiber).

The cellulose fiber may be any fibrous material containing mainly cellulose (narrowly defined cellulose) as a chemical compound, and in addition to cellulose (narrowly defined cellulose) may include hemicellulose or lignin. The form of the feedstock M1 is not specifically limited, and it may be woven cloth or non-woven cloth. The feedstock M1 may also be recycled paper manufactured (recycled) by defibrating paper or recovered paper, or synthetic Yupo paper (R), and does not need to be recycled paper. In this embodiment, the feedstock M1 is previously used recovered paper.

The shredder 12 is the part that executes the shredding process of shredding the feedstock M1 supplied from the feedstock supply device 11 in air (ambient air). The shredder 12 has a pair of shredder blades 121 and a chute (hopper) 122.

By turning in mutually opposite directions of rotation, the pair of shredder blades 121 shred the feedstock M1 passing therebetween, that is, cut the feedstock M1 into small shreds M2. The size and shape of the shreds M2 are preferably appropriate to the defibration process of the defibrator 13, and in this example are preferably pieces 100 mm or less on a side, and are further preferably pieces that are greater than or equal to 10 mm and less than or equal to 70 mm per side.

The chute 122 is located below the pair of shredder blades 121, and in this example is funnel-shaped. As a result, the chute 122 can easily catch the shreds M2 that are shredded and dropped by the shredder blades 121.

Above the chute 122, a wetting unit 231 is disposed beside the pair of shredder blades 121. The wetting unit 231 wets the shreds M2 in the chute 122. This wetting unit 231 has a filter (not shown in the figure) containing water, and is configured as a heaterless humidifier (or heated humidifier) that supplies a moist stream of air to the shreds M2 by passing air through the filter. By wet air being supplied to the shreds M2, accumulation of shreds M2 on the chute 122 due to static electricity can be suppressed.

The chute 122 connects to the defibrator 13 through a conduit (flow channel) 241. The shreds M2 collected in the chute 122 passes through the conduit 241 and are conveyed to the defibrator 13.

The defibrator 13 is the part that executes the defibrating process (see FIG. 5) that defibrates the shreds M2 in a dry process in air. Defibrated material M3 can be produced from the shreds M2 by the defibration process of the defibrator 13.

As used herein, defibrate means to break apart and detangle into single individual fibers shreds M2 composed of many fibers bonded together. The resulting detangled fibers are the defibrated material M3. The shape of the defibrated material M3 is strands and ribbons. The defibrated material M3 may also contain clumps, which are multiple fibers tangled together into clumps.

As shown in FIG. 4, the defibrator 13 in this embodiment has a cylindrical stator (liner) 131, a rotor 132 supported to rotate in the direction of arrow D132 inside the stator 131, and a motor (AC motor) 133 as the drive source for turning the rotor 132, and is configured as an impeller mill.

The stator 131 has multiple blades (not shown in the figure) on the inside circumference surface. The rotor 132 has multiple blades (not shown in the figure) on the outside circumference surface. When the shreds M2 are supplied to (flow into) between the stator 131 and rotor 132 while the rotor 132 is turning, the shreds M2 pass between the blades and are defibrated. As a result, defibrated material M3 is obtained from the shreds M2. The defibrated material M3 is then discharged from between the stator 131 and rotor 132, that is, from the defibrator 13.

The defibrator 13 also produces, by rotation of the rotor 132, a flow of air (an air current) from the shredder 12 to the classifier 14. As a result, the shreds M2 can be suctioned from the conduit 241 into the defibrator 13. The defibrated material M3 can also be fed through conduit 242 to the classifier 14 after defibration.

As shown in FIG. 5, the defibrator 13 has an inverter 134.

The inverter 134 comprises a converter circuit 135, an inverter circuit 136, and a capacitor 137.

The converter circuit 135 can convert an AC voltage from the power supply (controller 28) to a DC voltage. The converter circuit 135 is electrically connected to the inverter circuit 136 through the capacitor 137.

The inverter circuit 136 has a switching element (not shown in the figure) configured by a semiconductor device, and can apply an AC voltage to the motor 133 by turning the switching element on or off. The inverter circuit 136 can also adjust the frequency of the AC voltage by controlling the timing when the switching element switches on and off.

The inverter 134 can change the rotational velocity $V_{132}$ of the rotor 132 by adjusting the frequency of the AC voltage applied to the motor 133, that is, by PWM (pulse width modulation) control.

A blower 261 is disposed to the conduit 242. The blower 261 is an air current generator that produces a flow of air to the classifier 14. Conveyance of the defibrated material M3 to the classifier 14 is thereby promoted.

The classifier 14 is the part that executes the classification process of classifying the defibrated material M3 based on the length of the fibers. In the classifier 14, the defibrated material M3 is separated into first screened material M4-1, and second screened material M4-2 that is larger than the first screened material M4-1. The first screened material M4-1 is of a size appropriate to manufacturing sheets S downstream.

The average length of the fibers is preferably greater than or equal to 1 μm and less than or equal to 3000 μm, and less than 50 μm$^2$.

The second screened material M4-2 includes, for example, fiber that has not been sufficiently defibrated, and excessively agglomerated (clumped) defibrated fibers.

The classifier 14 includes a drum 141 (sieve), and a housing 142 enclosing the drum 141.

The drum 141 is a sieve comprising a cylindrical mesh body that rotates on its center axis. The defibrated material M3 is introduced to the drum 141. By the drum 141 rotating, defibrated material M3 that is smaller than the mesh passes through and is separated as first screened material M4-1, and defibrated material M3 that is larger than the mesh and therefore does not pass through, is separated as second screened material M4-2.

The first screened material M4-1 drops from the drum 141.

The second screened material M4-2 is discharged to the conduit (flow path) 243 connected to the drum 141. The end of the conduit 243 on the opposite end (downstream end) as the drum 141 is connected to another conduit 241. The second screened material M4-2 that passes through the conduit 243 merges with the shreds M2 inside the conduit 241, and is introduced with the shreds M2 to the defibrator 13. As a result, the second screened material M4-2 is returned to the defibrator 13 and passes through the defibrating process with the shreds M2.

The housing 142 is connected to a wetting unit 232. Like the wetting unit 231 described above, the wetting unit 232 is a heaterless humidifier. As a result, humidified air is supplied into the housing 142. This wet air moistens the first screened material M4-1, and as a result can suppress accretion of the first screened material M4-1 on the inside walls of the housing 142 due to static electricity.

The first screened material M4-1 from the drum 141 is dispersed while dropping through air, and descends toward the first web former 15 (accumulator) located below the drum 141. The first web former 15 is the part that executes a first web forming process (accumulation process) forming a first web M5 by accumulating the first screened material M4-1 derived from the defibrated material M3. The first web former 15 includes a mesh belt (belt) 151, three tension rollers 152, and a suction unit (suction mechanism) 153.

The mesh belt 151 is an endless belt on which the first screened material M4-1 accumulates. This mesh belt 151 is mounted on three tension rollers 152. By rotationally driving the tension rollers 152, the first screened material M4-1 (accumulated material) deposited on the mesh belt 151 is conveyed downstream.

One tension roller 152 of the three tension rollers 152 is connected to a motor (AC motor) 154 and functions as the drive roller, while the other two tension rollers 152 are follower rollers.

The size of the first screened material M4-1 is greater than or equal to the size of the mesh in the mesh belt 151. As a result, passage of the first screened material M4-1 through the mesh belt 151 is limited, and as a result the first screened material M4-1 accumulates on the mesh belt 151. Furthermore, because the first screened material M4-1 is conveyed downstream by the mesh belt 151 as the first screened material M4-1 accumulates on the mesh belt 151, the first screened material M4-1 is formed in a layer as a first web M5.

The first screened material M4-1 may also contain defibrated material M3 that can pass through without accumulating on the mesh belt 151, as well as other kinds of dust and dirt. The dust and dirt may be produced during shredding and defibration. Such dust and dirt is later recovered by the dust collector 27 described below.

The suction unit 153 suctions air from below the mesh belt 151. As a result, dust and dirt that passes through the mesh belt 151 can be suctioned with the air.

The suction unit 153 is connected to a dust collector 27 (recovery device) through another conduit (flow path) 244. Dust and dirt suctioned by the suction unit 153 is captured by the dust collector 27.

Another conduit (flow path) 245 is also connected to the dust collector 27. A blower 262 is disposed to the conduit 245. Operation of the blower 262 produces suction in the suction unit 153. This promotes formation of the first web M5 on the mesh belt 151. Dust and dirt are therefore removed from the material forming the first web M5. Operation of the blower 262 causes the dust and dirt to pass through the conduit 244 to the dust collector 27.

Another wetting unit 235 is disposed downstream from the classifier 14. This wetting unit 235 is configured as an ultrasonic humidifier that mists water. As a result, moisture can be supplied to the first web M5, and the moisture content of the first web M5 can thereby be adjusted. This adjustment can also suppress accretion of the first web M5 on the mesh belt 151 due to static electricity. As a result, the first web M5 easily separates from the mesh belt 151 at the tension roller 152 from where the mesh belt 151 returns to the upstream side.

The thickness detector 25 is disposed to the mesh belt 151 between the classifier 14 and wetting unit 235. The thickness detector 25 is the part that executes a detection process of detecting the thickness $T_{M5}$ of the first web M5. As described below, the controller 28 controls the rotational velocity $V_{132}$ of the rotor 132 based on the detection result from the thickness detector 25. Note that thickness detection by the thickness $T_{M5}$ is executed repeatedly in conjunction with conveyance of the first web M5. The detection result (thickness $T_{M5}$) is sent to the controller 28 each time it is output. Note that the timing of thickness $T_{M5}$ detection, that is, the detection interval, can be set as desired.

As described above, the first web former 15 (accumulator) has a mesh belt 151 (belt) for conveying the first web M5 (accumulated defibrated material).

As shown in FIG. 6 and FIG. 7, the thickness detector 25 is disposed above the mesh belt 151 at a position facing the middle of the width (Y-axis) of the mesh belt 151. The thickness detector 25 includes an emitter 251 configured to emit a light beam $L_{25}$ to the first web M5 (accumulated material) on the mesh belt 151 (belt), and a photodetector 252 configured to detect the reflection $L_{25}'$ of the light beam $L_{25}$ emitted from the emitter 251 and reflected by the first web M5 (accumulated material), and is configured as a reflective sensor with the emitter 251 and photodetector 252 combined in a single unit.

The thickness detector 25 thus configured can accurately detect the thickness $T_{M5}$ of the first web M5 based on the change in the reflection $L_{25}'$ detected by the photodetector 252 between the state shown in FIG. 6, that is, when the first web M5 is not formed on the mesh belt 151, and the state shown in FIG. 7, that is, when the first web M5 is present on the mesh belt 151.

The detection result (thickness $T_{M5}$) is sent to the controller 28, and used to control the rotational velocity $V_{132}$ of the rotor 132.

Note that the emitter 251 is not specifically limited, and may be a laser diode (LD) or light-emitting diode (LED), for example.

The photodetector 252 is also not specifically limited, and in this example is a photodiode. The resolution of the photodetector 252 is also not specifically limited, and is preferably greater than or equal to 0.001 mm and less than or equal to 0.01 mm, and yet further preferably greater than or equal to 0.001 mm and less than or equal to 0.005 mm.

The detection range (detection distance) of the photodetector 252 is not specifically limited, and in this example is preferably greater than or equal to 40 mm and less than or equal to 60 mm, and further preferably greater than or equal to 45 mm and less than or equal to 55 mm.

The thickness detector 25 is a reflective optical sensor in this embodiment as described above, but is not specifically limited and may be configured as a transmissive optical sensor.

The number of thickness detectors 25 is one in this embodiment, but is not specifically limited and there may be multiple thickness detectors 25. When multiple thickness detectors 25 are used, the thickness detectors 25 are preferably disposed at equal intervals across the width of the mesh belt 151, that is, on the Y-axis. This configuration enables using the average of the thickness $T_{M5}$ of the first web M5 detected by each of the thickness detectors 25 as the thickness $T_{M5}$ of the first web M5.

The location of the thickness detector 25 in this embodiment is above the mesh belt 151 and between the classifier 14 and wetting unit 235, but is not specifically limited. The location of the thickness detector 25 depends on the configuration of the web forming device 1, and may be between the detangler 18 and wetting unit 236 on the mesh belt 191 of the second web former 19 described below, between the calender 201 and heater 202 of the sheet former 20, or between the heater 202 of the sheet former 20 and the first cutter 211 of the sheet cutter 21. Yet further, a thickness detector 25 may be disposed to each of these positions.

On the downstream side of the wetting unit 235 is a cutter 16. The cutter 16 is a part that executes a cutting process of cutting the first web M5 that has separated from the mesh belt 151.

The cutter 16 has a propeller 161 that is rotationally supported, and a housing 162 that houses the propeller 161. The first web M5 is cut into pieces as it is fed into the rotating propeller 161. The cut first web M5 is thus processed into fragments M6. The fragments M6 then drop down in the housing 162.

The housing 162 is connected to another wetting unit 233. Like wetting unit 231 described above, wetting unit 233 is a heaterless humidifier. As a result, humidified air is supplied into the housing 162. This wet air suppresses sticking of the fragments M6 to the propeller 161 and to the inside walls of the housing 162 due to static electricity.

A mixing device 17 is disposed on the downstream side of the cutter 16. The mixing device 17 is the part that executes a mixing process of mixing the fragments M6 with resin P1. The mixing device 17 includes a resin supply device 171, a conduit (flow path) 172, and a blower 173.

The conduit 172 connects the housing 162 of the cutter 16 to the housing 182 of the detangler 18, and is a flow path through which a mixture M7 of the fragments M6 and resin P1 passes.

The resin supply device 171 connects to the conduit 172. The resin supply device 171 has a screw feeder 174. By rotationally driving the screw feeder 174, the resin P1 can be supplied in powder or particle form to the conduit 172. The resin P1 supplied to the conduit 172 is mixed with the fragments M6, forming the mixture M7.

Note that the resin P1 bonds fibers together in a downstream process, and may be a thermoplastic resin or a thermosetting resin, but is preferably a thermoplastic resin. Examples of such thermoplastic resins include AS resin, ABS resin, polyethylene, polypropylene, ethylene-vinylacetate copolymer (EVA), or other polyolefin, denatured polyolefins, polymethylmethacrylate or other acrylic resin, polyvinyl chloride, polystyrene, polyethylene terephthalate, polybutylene terephthalate or other polyesters, nylon 6, nylon 46, nylon 66, nylon 610, nylon 612, nylon 11, nylon 12, nylon 6-12, nylon 6-66 or other polyimide (nylon), polyphenylene ether, polyacetal, polyether, polyphenylene oxide, polyether ether ketone, polycarbonate, polyphenylene sulfide, thermoplastic polyimide, polyether imide, aromatic polyester, or other liquid crystal polymer, styrenes, polyolefins, polyvinyl chlorides, polyurethanes, polyesters, polyimides, polybutadienes, transpolyisoprenes, fluoroelastomers, polyethylene chlorides and other thermoplastic elastomers, as well as combinations of one or two or more of the foregoing. Preferably, a polyester or resin containing a polyester is used as the thermoplastic resin.

Additives other than resin P1 may also be supplied from the resin supply device 171, including, for example, coloring agents for adding color to the fiber, anti-blocking agents for suppressing clumping of the fiber and clumping of the resin P1, flame retardants for making the fiber and manufactured sheets difficult to burn, and paper strengtheners for increasing the strength of the sheet S. Compounds already incorporating such other additives with the resin P1 may also be supplied.

The blower 173 is disposed to the conduit 172 downstream from the resin supply device 171. The fragments M6 and resin P1 are also mixed by the action of a rotating unit such as blades of the blower 173.

The blower 173 is configured to produce an air current toward the detangler 18. This air current can also mix the fragments M6 and resin P1 inside the conduit 172. As a result, the mixture M7 can be introduced to the detangler 18 as a uniform dispersion of the fragments M6 and resin P1. The fragments M6 in the mixture M7 are further detangled into smaller fibers while travelling through the conduit 172.

The detangler 18 is the part that executes the detangling process that detangles interlocked fibers in the mixture M7.

The detangler 18 includes a drum 181 and a housing 182 that houses the drum 181.

The drum 181 is a sieve comprising a cylindrical mesh body that rotates on its center axis. The mixture M7 is introduced to the drum 181. By the drum 181 rotating, fiber in the mixture M7 that is smaller than the mesh can pass through the drum 181. The mixture M7 is detangled in this process.

The mixture M7 that is detangled in the drum 181 is dispersed while dropping through air, and falls to the second web former 19 located below the drum 181. The second web former 19 is the part that executes the second web forming process forming a second web M8 from the mixture M7. The second web former 19 includes a mesh belt (separation belt) 191, tension rollers 192, and a suction unit (suction mechanism) 193.

The mesh belt 191 is an endless belt on which the mixture M7 accumulates. This mesh belt 191 is mounted on four tension rollers 192. By rotationally driving the tension rollers 192, the mixture M7 deposited on the mesh belt 191 is conveyed downstream.

One tension roller 192 of the four tension rollers 192 is connected to a motor (AC motor) and functions as the drive roller, while the other three tension rollers 192 are follower rollers.

Most of the mixture M7 on the mesh belt 191 is larger than the mesh in the mesh belt 191. As a result, the mixture M7 is suppressed from passing through the mesh belt 191, and therefore accumulates on the mesh belt 191. The mixture M7 is conveyed downstream by the mesh belt 191 as the mixture M7 accumulates on the mesh belt 191, and is formed in a layer as the second web M8.

The suction unit 193 suctions air down from below the mesh belt 191. As a result, the mixture M7 can be pulled onto the mesh belt 191, and accumulation of the mixture M7 on the mesh belt 191 is thereby promoted.

Another conduit (flow path) 246 is connected to the suction unit 193. A blower 263 is also disposed to the conduit 246. Operation of the blower 263 produces suction in the suction unit 193.

Another wetting unit 234 is connected to the housing 182. Like the wetting unit 231 described above, wetting unit 234 is a heaterless humidifier. As a result, humidified air is supplied into the housing 182. By humidifying the inside of the housing 182 by adding wet air, sticking of the mixture M7 to the inside walls of the housing 182 due to static electricity can be suppressed.

Another wetting unit 236 is disposed below the detangler 18. This wetting unit 236 is configured as an ultrasonic humidifier similarly to the wetting unit 235 described above. As a result, moisture can be supplied to the second web M8, and the moisture content of the second web M8 can thereby be adjusted. Adjusting the moisture content can also suppress sticking of the second web M8 to the mesh belt 191 due to static electricity. As a result, the second web M8 easily separates from the mesh belt 191 at the tension roller 192 from where the mesh belt 191 returns to the upstream side.

Note that the amount of moisture (total moisture content) added by wetting unit 231 to wetting unit 236 is, for example, preferably greater than or equal to 0.5 parts by weight and less than or equal to 20 parts by weight per 100 parts by weight of the material before adding water.

A sheet former 20 is disposed downstream from the second web former 19. The sheet former 20 is the part that executes the sheet forming process forming sheets S from the second web M8. This sheet former 20 includes a calender 201 and a heater 202.

The calender 201 comprises a pair of calender rolls 203, and the second web M8 can be compressed without heating (without melting the resin P1) by passing the second web M8 between the calender rolls 203. This process increases the density of the second web M8. The second web M8 is then conveyed toward the heater 202. Note that one of the pair of calender rolls 203 is a drive roller that is driven by operation of a motor (not shown in the figure), and the other is a driven roller.

The heater 202 has a pair of heat rollers 204, which can heat while compressing the second web M8 passing between the heat rollers 204. The combination of heat and pressure melts the resin P1 in the second web M8, and bonds fibers through the molten resin P1. As a result, a sheet S is formed.

The sheet S is then conveyed to the paper cutter 21. Note that one of the pair of heat rollers 204 is a drive roller that is driven by operation of a motor (not shown in the figure), and the other is a driven roller.

A paper cutter 21 is disposed downstream from the sheet former 20. The paper cutter 21 is the part that executes the sheet cutting process that cuts the continuous sheet S into single sheets S. The paper cutter 21 includes a first cutter 211 and a second cutter 212.

The first cutter 211 cuts the sheet S in the direction crosswise to the conveyance direction of the sheet S.

The second cutter 212 is downstream from the first cutter 211, and cuts the sheets S in the direction parallel to the conveyance direction of the sheet S.

Sheets S of a desired size are produced by the cutting action of the first cutter 211 and the second cutter 212. The sheets S are then conveyed further downstream and stacked in a stacker 220.

When the feedstock M1 is recovered paper (paper that was previously used), for example, the recovered paper may be relatively easy to defibrate or relatively difficult to defibrate depending on the type of recovered paper. Different types of recovered paper may also be mixed together when loaded into the sheet manufacturing apparatus 100 (web forming device 1).

In this event, if the defibration operation of the defibrator 13, that is, the rotational velocity $V_{132}$ of the rotor 132 in the defibrator 13, stays constant, recovered paper that is relatively easy to defibrate may be more finely defibrated than recovered paper that is relatively difficult to defibrate, and depending on the degree of defibration, may be excessively defibrated. Excessive defibration can then result in inconsistent grammage or inconsistent thickness in different sheets of paper or even within a single sheet of recycled paper. Conversely, recovered paper that is relatively difficult to defibrate may be insufficiently defibrated by the defibrator 13. When insufficiently defibrated, sheet thickness may decrease over time in each recycled sheet S that is made.

The sheet manufacturing apparatus 100 (web forming device 1) according to this embodiment of the invention is configured to solve this problem by the configuration and operation described below.

The controller 28 sequentially performs two control operations.

The first control operation (referred to below as "first control") reduces the rotational velocity $V_{132}$ of the rotor 132 when the variation $\Delta T_{M5}$ in the thickness $T_{M5}$ of the first web M5 detected by thickness detector 25 (thickness detection step) exceeds first tolerance A. This first control operation corresponds to steps S102 to S105 in FIG. 8 described below.

Note that the decision of step S103 in FIG. 8 is based on the flow chart shown in FIG. 9. The flow charts in FIG. 8 and FIG. 9 are described below. The graph in FIG. 11 is a graph showing the trend in the change over time in thickness $T_{M5}$ before control, and the graph in FIG. 12 is a graph showing the trend in the change over time in thickness $T_{M5}$ after control.

Note also that variation $\Delta T_{M5}$ is the thickness $T_{M5}$ (measured value) actually detected by the thickness detector 25 minus the target thickness $T_{M5}$ (target value). This variation $\Delta T_{M5}$ is calculated every time thickness $T_{M5}$ is detected.

The target value is previously stored in the storage 282 of controller 28. The target value can also be changed (rewritten) as needed. In the example shown in FIG. 11, when the thickness $T_{M5}$ of the target value is 2 mm, variation $\Delta T_{M5}$ is the amount added where the actually measured thickness $T_{M5}$ is 2.7 mm. In this case, variation $\Delta T_{M5}$ is 0.7. In the example in FIG. 12, when the target thickness $T_{M5}$ is 2 mm, variation $\Delta T_{M5}$ is the amount added where the actually measured thickness $T_{M5}$ is 2.2 mm. In this case, variation $\Delta T_{M5}$ is 0.2.

First tolerance A is the range for determining if defibration is excessive or not, defibration is determined to not be excessive if variation $\Delta T_{M5}$ is within the range of first tolerance A, and defibration is determined to be excessive if variation $\Delta T_{M5}$ is outside the range of first tolerance A. This first tolerance A is also previously stored in the storage 282 of controller 28.

The first tolerance A can also be changed (rewritten) appropriately according the type of feedstock M1, for example. In FIG. 11 and FIG. 12, referenced to a 2.0 mm target thickness $T_{M5}$ of the first web M5 as the 0 base line, the first tolerance A is a range with an upper limit of +0.5, that is, a maximum thickness $T_{M5}$ of 2.5 mm, and a bottom limit of −0.5, that is, a minimum thickness $T_{M5}$ of 1.5 mm.

The second control operation increases the rotational velocity $V_{132}$ of the rotor 132 when the slope $\alpha_{M5}$ of the time change in the thickness $T_{M5}$ of the first web M5 detected by the thickness detector 25 (thickness detection step) goes below second tolerance B. This second control operation corresponds to steps S106 to S109 in FIG. 8.

Note that the decision of step S107 in FIG. 8 is based on the flow chart shown in FIG. 10. The flow chart in FIG. 10 is described below. The graph in FIG. 13 is a graph showing the trend in the change over time in thickness $T_{M5}$ before control, and the graph in FIG. 14 is a graph showing the trend in the change over time in thickness $T_{M5}$ after control.

Note that slope $\alpha_{M5}$ is the slope of the regression line SL1 obtained from the thickness $T_{M5}$ (measured value) actually detected by the thickness detector 25 per unit of time (in the example in FIG. 13 and FIG. 14, 400 seconds). The slope $\alpha_{M5}$ is calculated in each unit of time.

Second tolerance B is the slope of the line SL2 (critical thickness $T_{M5}$ reduction rate over time) indicating the time change in the thickness $T_{M5}$ for determining if defibration is insufficient or not, and if slope $\alpha_{M5}$ is greater than or equal to second tolerance B, defibration is not insufficient, and if slope $\alpha_{M5}$ is less than second tolerance B, defibration is insufficient. This second tolerance B is also previously stored in storage 282 of controller 28. This second tolerance B can also be changed (rewritten) appropriately according the type of feedstock M1, for example.

The control program whereby the controller 28 executes the first control and second control is described below based on the flow charts in FIG. 8 to FIG. 10.

First, the thickness $T_{M5}$ of the first web M5 is detected by the thickness detector 25 (step S101). As described above, the thickness $T_{M5}$ is repeatedly detected by the thickness detector 25 in conjunction with conveyance of the first web M5, and each detection result is sent to the controller 28.

Next, variation $\Delta T_{M5}$ is calculated by subtracting the target thickness $T_{M5}$ (target value) from the thickness $T_{M5}$ (measured value) detected in step S101 (step S102).

Next, whether or not variation $\Delta T_{M5}$ is outside the range of first tolerance A is determined (step S103). More specifically, step S103 determines if variation $\Delta T_{M5}$ exceeds the upper limit of first tolerance A, or is below the lower limit of first tolerance A.

If in step S103 the variation $\Delta T_{M5}$ is determined to be outside the range of first tolerance A, the rotational velocity $V_{132}$ of the rotor 132 of the defibrator 13 is reduced (step S104).

Next, the thickness $T_{M5}$ of the first web M5 is again detected by the thickness detector 25 (step S105). After executing this step S105, control returns to step S102, and the process repeats from step S102.

When variation $\Delta T_{M5}$ is determined in step S103 to not be outside the range of first tolerance A, slope $\alpha_{M5}$ is calculated (step S106), and whether or not this slope $\alpha_{M5}$ is less than second tolerance B is determined (step S107).

If step S107 determines slope $\alpha_{M5}$ is below second tolerance B, the rotational velocity $V_{132}$ of the rotor 132 of the defibrator 13 is increased (step S108).

Next, the thickness $T_{M5}$ of the first web M5 is again detected by the thickness detector 25 (step S109). After executing this step S109, control returns to step S106, and the process repeats from step S106.

If in step S107 slope $\alpha_{M5}$ is determined to be less than the second tolerance B, steps S108 and S109 repeat.

As a result of these control steps, if the change over time in the thickness $T_{M5}$ is as shown in FIG. 11 (that is, if variation $\Delta T_{M5}$ is outside the range of first tolerance A, more specifically variation $\Delta T_{M5}$ exceeds the upper limit of the first tolerance A range or is below the lower limit of first tolerance A), the rotational velocity $V_{132}$ of the rotor 132 of the defibrator 13 is adjusted by the first control (step S102-step S105) to achieve the state shown in FIG. 12 (that is, a state in which variation $\Delta T_{M5}$ is not outside the range of first tolerance A, or more specifically is within the range of first tolerance A).

In addition, if the change over time in thickness $T_{M5}$ is as shown in FIG. 13 (that is, thickness $T_{M5}$ is gradually decreasing over time), the rotational velocity $V_{132}$ of the rotor 132 of the defibrator 13 is adjusted by the second control (step S106-step S109) to achieve the state shown in FIG. 14 (a state in which the decrease over time in thickness $T_{M5}$ is eliminated).

The thickness $T_{M5}$ of the first web M5 is thus desirably improved as described above. As a result, inconsistent grammage or inconsistent thickness in different sheets of paper or even within a single sheet of recycled paper can be prevented. A gradual decrease in thickness over time as sheets S are made can also be prevented. The sheet manufacturing apparatus 100 can therefore continuously manufacture sheets S with consistent quality.

Note that when applying the first control (step S102-step S105), in step S104 the controller 28 preferably decreases the rotational velocity $V_{132}$ of the rotor 132 within a range of greater than or equal to 5% and less than or equal to 20%, and further preferably decreases the rotational velocity $V_{132}$ within a range of greater than or equal to 8% and less than or equal to 12%.

As a result, variation $\Delta T_{M5}$ can be quickly, that is, in a short time, set within the range of first tolerance A.

In addition, when applying the second control (step S106-step S109), in step S108 the controller 28 preferably increases the rotational velocity $V_{132}$ of the rotor 132 within a range of greater than or equal to 5% and less than or equal to 20%, and further preferably increases the rotational velocity $V_{132}$ within a range of greater than or equal to 5% and less than or equal to 15%.

As a result, slope $\alpha_{M5}$ can be quickly, that is, in a short time, set greater than or equal to second tolerance B.

Whether or not the variation $\Delta T_{M5}$ is outside the range of first tolerance A in step S103 is preferably determined as described below.

As shown in FIG. 9, a timer incorporated in the controller 28 operates (step S201).

Next, the number of times $N_A$ (detection count) that variation $\Delta T_{M5}$ is outside the range of first tolerance A is counted, and the count $N_A$ is stored in storage 282 (step S202).

Next, when the time counted by the timer reaches the end of the time set as the unit of time (referred to below as the time is up) (step S203), whether or not count $N_A$ exceeds a threshold value N1 (first threshold) is determined (step S204). This threshold value N1 is a value indicating that when the count $N_A$ exceeds the threshold value N1, defibration by the defibrator 13 is excessive, and inconsistent grammage or inconsistent thickness may result in the sheet S.

If count $N_A$ is determined to exceed threshold value N1 in step S204, variation $\Delta T_{M5}$ is determined to be outside the range of first tolerance A (step S205).

However, if count $N_A$ is not determined to exceed threshold value N1 in step S204, variation $\Delta T_{M5}$ is determined to not be outside the range of first tolerance A (step S206).

When executing the first control (step S102-step S105) as described above, in step S103 the controller 28 determines variation $\Delta T_{M5}$ is outside the range of first tolerance A if the number of times $N_A$ the variation $\Delta T_{M5}$ is outside the first tolerance A in each unit of time after the timer starts exceeds threshold value N1. This decision method can prevent unnecessarily reducing the rotational velocity $V_{132}$.

Note also that the reduction rate of the rotational velocity $V_{132}$ in step S104 may be desirably changed or adjusted according to the size of the count NA.

Whether or not the slope $\alpha_{M5}$ is below the second tolerance B in step S107 is preferably determined as described below.

As shown in FIG. 10, a timer incorporated in the controller 28 operates (step S301).

Next, the number of times $N_B$ (detection count) that slope $\alpha_{M5}$ is below the second tolerance B is counted, and the count $N_B$ is stored in storage 282 (step S302).

Next, when the time is up (step S303), whether or not count $N_B$ exceeds a threshold value N2 (second threshold) is determined (step S304). This threshold value N2 is a value indicating that when the count $N_B$ exceeds the threshold value N2, defibration by the defibrator 13 is insufficient, and the thickness of the manufactured sheet S may decrease gradually over time.

If count $N_B$ is determined to exceed threshold value N2 in step S304, slope $\alpha_{M5}$ is determined to be below second tolerance B (step S305).

However, if count $N_B$ is not determined to exceed threshold value N2 in step S304, slope $\alpha_{M5}$ is determined to not be below the second tolerance B (step S306).

When executing the second control (step S106-step S109) as described above, in step S107 the controller 28 determines slope $\alpha_{M5}$ is below the second tolerance B if the number of times $N_B$ the slope $\alpha_{M5}$ is below the second tolerance B in each unit of time after the timer starts exceeds threshold value N2. This decision method can prevent unnecessarily increasing the rotational velocity $V_{132}$.

Note also that the rate of increase in the rotational velocity $V_{132}$ in step S108 may be desirably changed or adjusted according to the size of the count NB.

Note that the controller 28 first applies the first control and then the second control in this embodiment, but the invention is not so limited and may apply the second control and then the first control.

In addition, the controller 28 in this embodiment applies both the first control and second control, but the invention is not so limited and may omit the first control or omit the second control according to the type of shreds M2, for example.

In this embodiment the first control and second control are applied when forming the first web M5, but the invention is not so limited and may be applied when forming the second web M8, or both when forming the first web M5 and when forming the second web M8.

Embodiment 2

Figure 15:
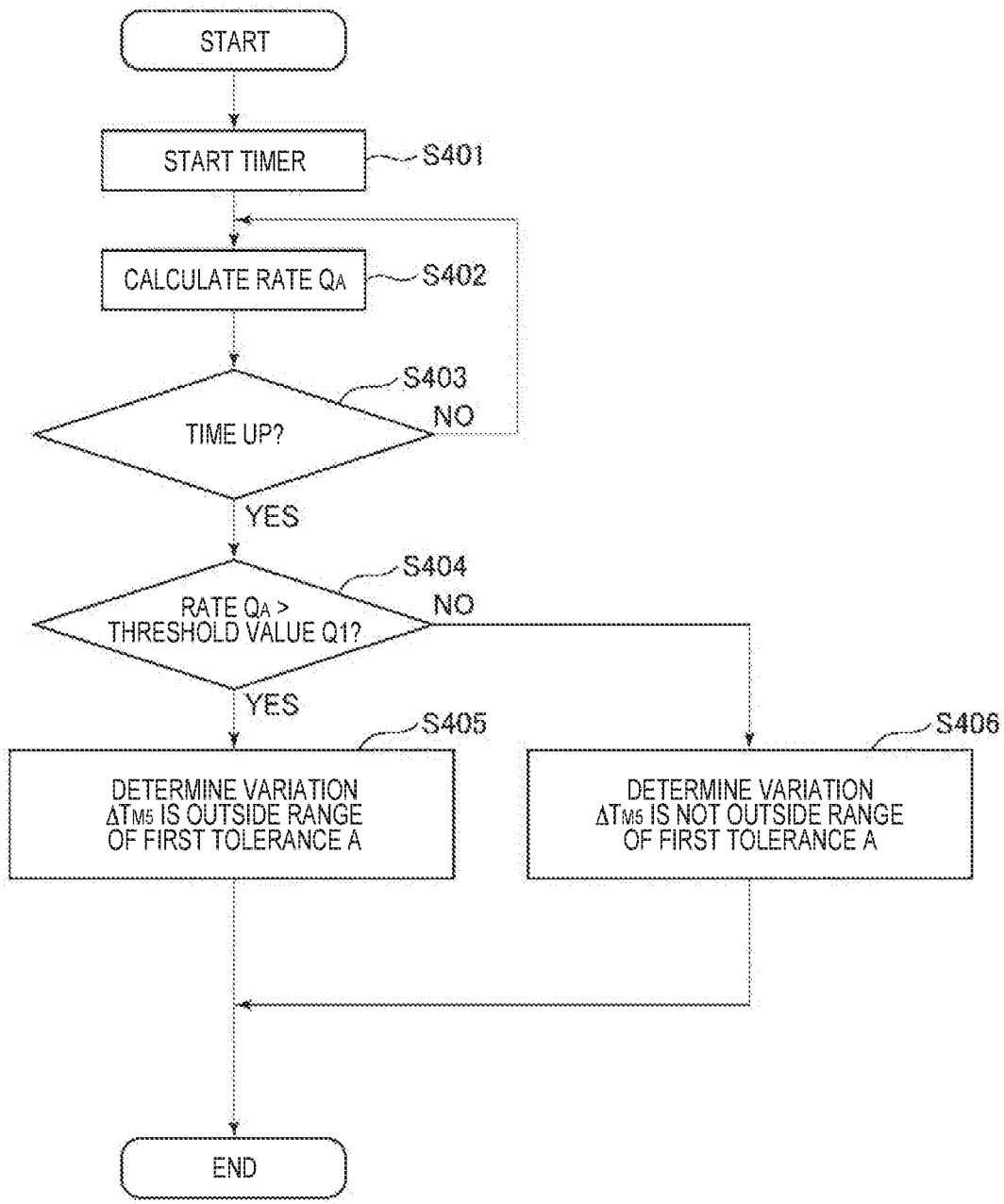
FIG. 15 is a flow chart of a control program executed by the controller of the sheet manufacturing apparatus (web forming device) according to a second embodiment of the invention.

FIG. 15 is a flow chart of the control program run by the controller in a sheet manufacturing apparatus (web forming device) according to a second embodiment of the invention.

A second embodiment of a web forming device, web forming method, and sheet manufacturing apparatus according to the invention is described below with reference to the accompanying figures, focusing on the differences between this and the foregoing embodiment, and omitting or simplifying further description of like elements.

This embodiment is the same as the first embodiment described above except for the method of determining if the variation in the thickness of the first web is outside the range of a first tolerance value when applying the first control.

Whether or not the variation $\Delta T_{M5}$ is outside the range of first tolerance A in step S103 is preferably determined as described below in this embodiment.

As shown in FIG. 15, a timer incorporated in the controller 28 operates (step S401).

Next, the rate $Q_A$ of variation $\Delta T_{M5}$ from the first tolerance A is calculated, and this rate $Q_A$ is stored in storage 282 (step S402).

Next, when the time is up (step S403), whether or not the rate $Q_A$ exceeds a threshold value Q1 (first threshold) is determined (step S404). This threshold value Q1 is a value indicating that when the rate $Q_A$ exceeds the threshold value Q1, defibration by the defibrator 13 is excessive, and inconsistent grammage or inconsistent thickness may result in the sheet S.

If rate $Q_A$ is determined to exceed threshold value Q1 in step S404, variation $\Delta T_{M5}$ is determined to be outside the range of first tolerance A (step S405).

However, if rate $Q_A$ is not determined to exceed threshold value Q1 in step S404, variation $\Delta T_{M5}$ is determined to not be outside the range of first tolerance A (step S406).

When executing the first control in this embodiment, in step S103 the controller 28 determines variation $\Delta T_{M5}$ is outside the range of first tolerance A if the rate $Q_A$ of variation $\Delta T_{M5}$ from the first tolerance A in each unit of time after the timer starts exceeds threshold value Q1. This control method is effective when using a rate $Q_A$ for the decision in step S103 is desirable. This decision method can prevent unnecessarily reducing the rotational velocity $V_{132}$.

Note also that the reduction rate of the rotational velocity $V_{132}$ in step S104 may be desirably changed or adjusted according to the rate $Q_A$.

Embodiment 3

Figure 16:
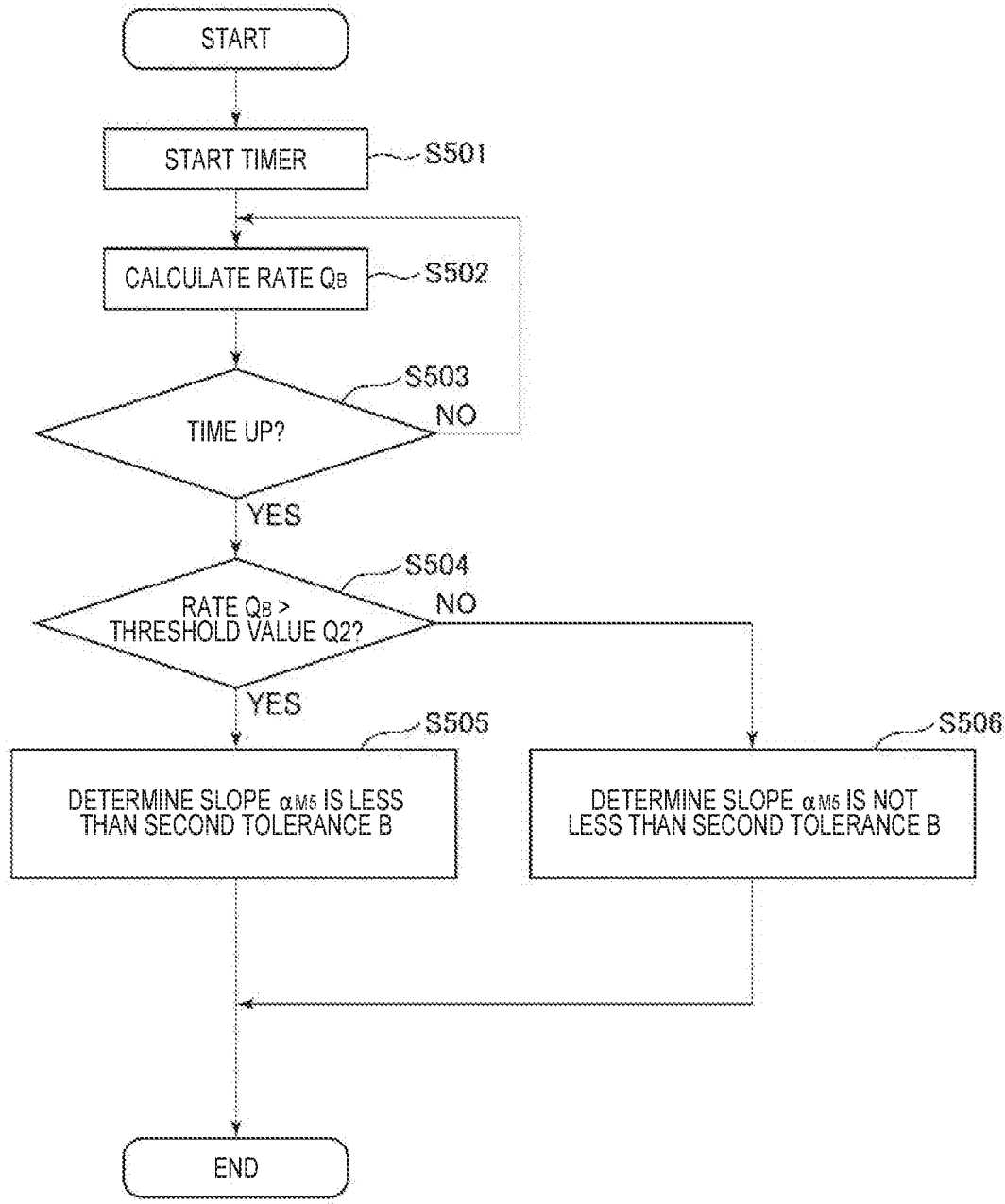
FIG. 16 is a flow chart of a control program executed by the controller of the sheet manufacturing apparatus (web forming device) according to a third embodiment of the invention.

FIG. 16 is a flow chart of the control program run by the controller in a sheet manufacturing apparatus (web forming device) according to a third embodiment of the invention.

A third embodiment of a web forming device, web forming method, and sheet manufacturing apparatus according to the invention is described below with reference to the accompanying figures, focusing on the differences between this and the foregoing embodiment, and omitting or simplifying further description of like elements.

This embodiment is the same as the first embodiment described above except for the method of determining if the slope of change over time in the thickness of the first web is outside the range of a second tolerance value when applying the second control.

As shown in FIG. 16, a timer of the controller 28 operates (step S501).

Next, the rate $Q_B$ of the drop in the slope $\alpha_{M5}$ below the second tolerance B is calculated, and this rate $Q_B$ is stored in storage 282 (step S502).

Next, when the time is up (step S503), whether or not rate $Q_B$ exceeds a threshold value Q2 (second threshold) is determined (step S504). This threshold value Q2 is a value indicating that when the rate $Q_B$ exceeds the threshold value Q2, defibration by the defibrator 13 is insufficient, and the thickness of the manufactured sheet S may decrease gradually over time.

If rate $Q_B$ is determined to exceed threshold value Q2 in step S504, slope $\alpha_{M5}$ is determined to be below second tolerance B (step S505).

However, if rate $Q_B$ is not determined to exceed threshold value Q2 in step S504, slope $\alpha_{M5}$ is determined to not be below the second tolerance B (step S506).

When executing the second control in this embodiment, in step S107 the controller 28 determines slope $\alpha_{M5}$ is below the second tolerance B if the rate $Q_B$ of the slope $\alpha_{M5}$ below the second tolerance B during each unit of time after the timer starts exceeds threshold Q2. This control method is effective when using a rate $Q_B$ for the decision in step S107 is desirable. This decision method can prevent unnecessarily increasing the rotational velocity $V_{132}$.

Note also that the rate of increase in the rotational velocity $V_{132}$ in step S108 may be desirably changed or adjusted according to the rate $Q_B$.

Note that this embodiment may also use the decision method of the second embodiment in step S103, that is, may make the decision using rate $Q_A$.

Embodiment 4

Figure 17:
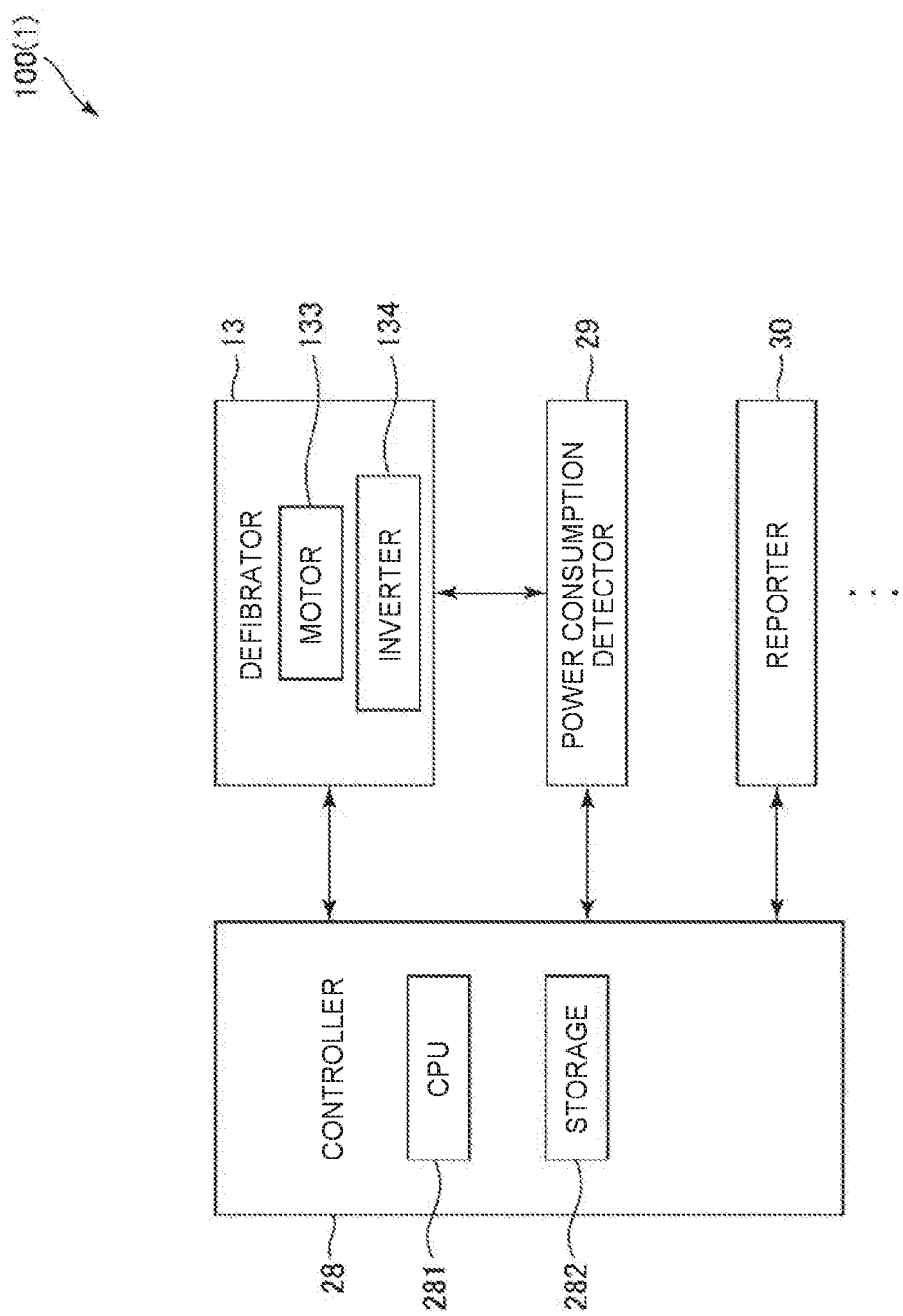
FIG. 17 is a flow chart of a control program executed by the controller of the sheet manufacturing apparatus (web forming device) according to a fourth embodiment of the invention.
Figure 18:
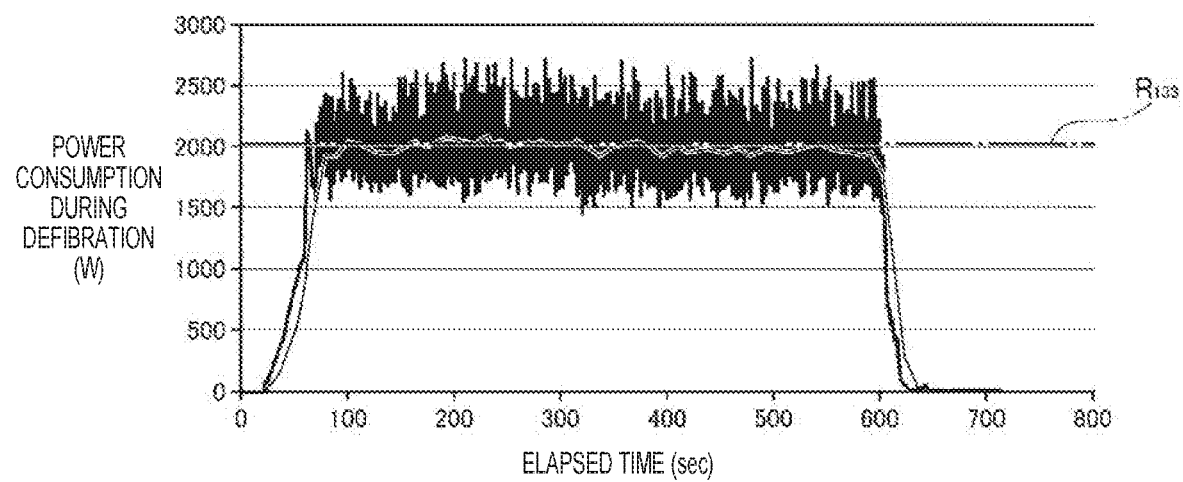
FIG. 18 is a graph showing an example of the relationship between elapsed time and power consumption during defibration.
Figure 19:
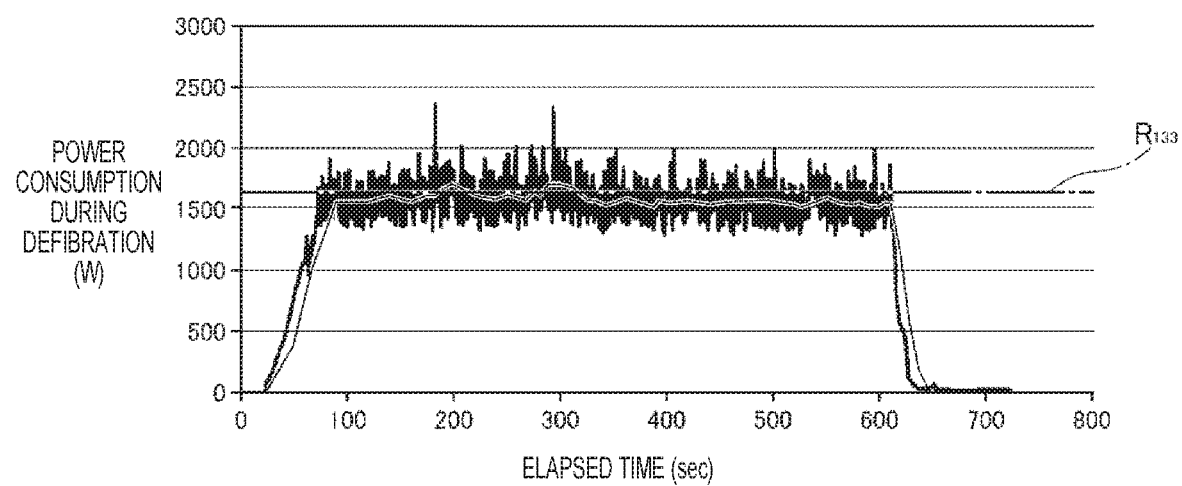
FIG. 19 is a graph showing an example of the relationship between elapsed time and power consumption during defibration.

FIG. 17 is a block diagram of main parts of a sheet manufacturing apparatus (web forming device) according to a fourth embodiment of the invention. FIG. 18 is a graph showing an example of the relationship between elapsed time and power consumption during defibration. FIG. 19 is a graph showing an example of the relationship between elapsed time and power consumption during defibration.

A fourth embodiment of a web forming device, web forming method, and sheet manufacturing apparatus according to the invention is described below with reference to the accompanying figures, focusing on the differences between this and the foregoing embodiment, and omitting or simplifying further description of like elements.

This embodiment is the same as the first embodiment except for the configuration of the sheet manufacturing apparatus (web forming device).

As shown in FIG. 17, the sheet manufacturing apparatus 100 (web forming device 1) in this embodiment also has a power consumption detector 29 configured to detect the power consumption $R_{133}$ of the 133 when driving the rotor 132 of the defibrator 13.

The configuration of the power consumption detector 29 is not specifically limited and in this embodiment is configured to extract the center of the waveform of the power consumption of the motor 133 when turning, and uses the extracted value as the power consumption $R_{133}$ (average power consumption). For example, in FIG. 18 the power consumption $R_{133}$ of the motor 133 is 2000 W, and in FIG. 19 the power consumption $R_{133}$ of the motor 133 is 1600 W.

The sheet manufacturing apparatus 100 (web forming device 1) also has a reporter 30 configured to report information related to the ease of shred M2 (defibration feedstock) defibration by the defibrator 13 based on the output from the power consumption detector 29.

The configuration of the reporter 30 is also not specifically limited, and may be a monitor that displays an image, multiple indicator lamps that emit different colors of light, or a speaker that outputs audio.

As described in the first embodiment, when the shreds M2 are shredded from previously used recovered paper, for example, the shreds M2 may be relatively easy to defibrate or relatively difficult to defibrate depending on the type of recovered paper. The power consumption $R_{133}$ of the defibrator 13 when defibrating relatively easily defibrated shreds M2 is different from the power consumption when defibrating shreds M2 that are relatively difficult to defibrate, and power consumption $R_{133}$ tends to be lower when defibrating relatively easily defibrated shreds M2 than when defibrating shreds M2 that are relatively difficult to defibrate.

By the power consumption detector 29 detecting power consumption $R_{133}$ and reporting the result through the reporter 30, the operator of the sheet manufacturing apparatus 100 can know if the shreds M2 currently being defibrated are relatively easily defibrated or are relatively difficult to defibrate. If the operator manually switches the sheet manufacturing apparatus 100 between the first control and second control described above, this can help the operator change the control method appropriately.

For example, suppose power consumption $R_{133}$ of 2000 W is the reference standard (see FIG. 18), and control preferably changes if the actual power consumption $R_{133}$ during defibration is less than the reference by 10% or more. In this case, if the actual power consumption $R_{133}$ is 1600 W (more than 10% less than the reference) as shown in the example in FIG. 19, control is preferably changed.

This control change is handled manually in this example, but may be automated.

The power consumption detector 29 is also preferably configured to cancel noise when detecting the power consumption $R_{133}$. This enables accurately detecting power consumption $R_{133}$.

Preferred embodiments of a web forming device, web forming method, and sheet manufacturing apparatus according to the invention are described above, but the invention is not so limited. For example, parts of the web forming device and sheet manufacturing apparatus may also replaced with equivalent configurations having the same function.

Other configurations may also be added as desired.

In addition, a web forming device, web forming method, and sheet manufacturing apparatus according to the invention may be a combination of any two or more desirable configurations (features) of the embodiments described above.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

The entire disclosure of Japanese Patent Application No. 2018-061110 filed Mar. 28, 2018 is expressly incorporated herein by reference.

What is claimed is:

1. A web forming device comprising:
a defibrator having a variable speed rotor, and configured to defibrate defibration feedstock by rotation of the rotor;
an accumulator on which defibrated material defibrated by the defibrator accumulates;
a thickness detector configured to:
repeatedly detect a thickness of the defibrated material accumulated on the accumulator as the defibrated material is moved relative to the thickness detector by a moving mechanism; and
output a plurality of detection results; and
a controller configured to control a rotational velocity of the rotor based on the plurality of detection results from the thickness detector,
wherein the controller is configured to apply either or both a first control and a second control,
in the first control, the controller is configured to:
calculate a variation of the thicknesses corresponding to the plurality of detection results;
determine whether the variation of the thicknesses is outside of a first predetermined range, the first predetermined range is from a first thickness value to a second thickness value, the first thickness value is a sum of a target thickness value and a first positive thickness value, and the second thickness value is obtained by deducting a first negative value from the target thickness value; and
when the controller determines that the variation of the thicknesses is outside of the first predetermined range, the controller is configured to decrease the rotational velocity of the rotor, and
in the second control, the controller is configured to:
calculate a slope of change over time of the thicknesses corresponding to the plurality of detection results;
determine whether the calculated slope of change is outside of or within a second predetermined range; and
when the controller determines that the calculated slope of change is within the second predetermined range, the controller is configured to increase the rotational velocity of the rotor.

2. The web forming device described in claim 1, wherein:
in the first control, the controller determines that the variation of the thicknesses is outside of the first predetermined range when a number of times the variation of the thicknesses being outside of the first predetermined range per a unit of time exceeds a first threshold value.

3. The web forming device described in claim 1, wherein:
in the first control, the controller determines that the variation of the thicknesses is outside of the first predetermined range when a rate of the variation of the thicknesses being outside of the first predetermined range per a unit of time exceeds a second threshold value.

4. The web forming device described in claim 1, wherein:
in the first control, the controller decreases the rotational velocity of the rotor greater than or equal to 5% and less than or equal to 20%.

5. The web forming device described in claim 1, wherein:
in the second control, the controller determines that the calculated slope of change is within the second predetermined range when a number of times the calculated slope of change being within the second predetermined range per unit of time exceeds a third threshold value.

6. The web forming device described in claim 1, wherein:
in the second control, the controller determines that the calculated slope of change is within the second predetermined range when a rate the calculated slope of change being within the second predetermined range per unit of time exceeds a fourth threshold value.

7. The web forming device described in claim 1, wherein:
in the second control, the controller increases the rotational velocity of the rotor greater than or equal to 5% and less than or equal to 20%.

8. The web forming device described in claim 1, wherein:
the accumulator has a belt configured to convey the defibrated material deposited thereon, and
the thickness detector includes an emitter configured to emit light to the defibrated material on the belt, and a photodetector configured to detect reflection of the light from the defibrated material.

9. The web forming device described in claim 1, further comprising:
a power consumption detector configured to detect power consumption when the rotor turns.

10. The web forming device described in claim 9, further comprising:
a reporter configured to report, based on a detection result from the power consumption detector, information related to a defibration state of the defibration feedstock by the defibrator.

11. A web forming method comprising:
a defibration step of defibrating, by rotation of a variable speed rotor, defibration feedstock supplied to the rotor;
an accumulation step of accumulating defibrated material defibrated in the defibration step;
a thickness detection step configured to repeatedly detect a thickness of the defibrated material accumulated in the accumulation step as the defibrated material is moved by a moving mechanism and configured to output a plurality of detection results; and
a control step configured to control a rotational velocity of the rotor in the defibration step based on the plurality of detection results from the thickness detection step and configured to apply in the defibration step either or both a first control and a second control,
wherein in the first control, the control step is configured to:
calculate a variation of the thicknesses corresponding to the plurality of detection results;
determine whether the variation of the thicknesses is outside of a first predetermined range, the first predetermined range is from a first thickness value to a second thickness value, the first thickness value is a sum of a target thickness value and a first positive thickness value, and the second thickness value is obtained by deducting a first negative value from the target thickness value; and
when in the control step, variation of the thicknesses is outside of the first predetermined range, the control step is configured to decrease the rotational velocity of the rotor, and
in the second control, the control step is configured to:
calculate a slope of change over time of the thicknesses corresponding to the plurality of detection results;
determine whether the calculated slope of change is outside of or within a second predetermined range; and
when in the control step, the calculated slope of change is within the second predetermined range, the control step is configured to increase the rotational velocity of the rotor.

12. A sheet manufacturing apparatus comprising:
the web forming device described in claim 1; and
a sheet forming device configured to make a sheet from the accumulated defibrated material.

* * * * *